US011164292B2

(12) United States Patent
Paik et al.

(10) Patent No.: US 11,164,292 B2
(45) Date of Patent: Nov. 2, 2021

(54) SYSTEM AND METHOD FOR CORRECTING IMAGE THROUGH ESTIMATION OF DISTORTION PARAMETER

(71) Applicant: CHUNG ANG University industry Academic Cooperation Foundation, Seoul (KR)

(72) Inventors: Joonki Paik, Seoul (KR); Minjung Lee, Seoul (KR); Hyungtae Kim, Seoul (KR)

(73) Assignee: CHUNG ANG University industry Academic Cooperation Foundation, Seoul (KR)

( * ) Notice: Subject to any disclaimer, the term of this patent is extended or adjusted under 35 U.S.C. 154(b) by 176 days.

(21) Appl. No.: 16/596,163

(22) Filed: Oct. 8, 2019

(65) Prior Publication Data

US 2020/0134789 A1   Apr. 30, 2020

(30) Foreign Application Priority Data

Oct. 31, 2018   (KR) .......................... 10-2018-0132180

(51) Int. Cl.
*G06K 9/40*       (2006.01)
*G06T 5/00*       (2006.01)
*G06K 9/00*       (2006.01)

(52) U.S. Cl.
CPC .......... *G06T 5/006* (2013.01); *G06K 9/00281* (2013.01); *G06T 2207/30201* (2013.01)

(58) Field of Classification Search
CPC ........... G06T 5/006; G06T 2207/30201; G06T 5/001; G06T 7/11; G06K 9/00281; G06K 9/46

(Continued)

(56) References Cited

U.S. PATENT DOCUMENTS

2017/0330308 A1* 11/2017 Chen ....................... G06T 5/006

FOREIGN PATENT DOCUMENTS

JP    2005-328570 A    11/2005
JP    2006-010613 A    1/2006
(Continued)

OTHER PUBLICATIONS

Korean Office Action for related KR Application No. 10-2018-0132180 dated Jan. 3, 2020 from Korean Intellectual Property Office.
(Continued)

*Primary Examiner* — Stephen P Coleman

(74) *Attorney, Agent, or Firm* — Paratus Law Group, PLLC

(57) ABSTRACT

Provided are a system and method for correcting an image through estimation of a distortion parameter. The method includes receiving a distorted image including one or more measurement targets, extracting a plurality of feature points from each of the measurement targets, classifying the one or more measurement targets as a distorted target and an undistorted target by comparing distances between the plurality of extracted feature points and a center point of the received distorted image with each other, estimating a distortion parameter on the basis of standard deviations of a plurality of feature points of the classified distorted target and undistorted target, and correcting the received distorted image on the basis of the estimated distortion parameter.

10 Claims, 14 Drawing Sheets

(58) Field of Classification Search
USPC .......................................................... 382/275
See application file for complete search history.

(56) References Cited

FOREIGN PATENT DOCUMENTS

| | | | |
|---|---|---|---|
| JP | 2011-049733 | A | 3/2011 |
| JP | 2011049733 | A * | 3/2011 |
| KR | 10-2010-0091383 | A | 8/2010 |
| KR | 10-1014572 | B1 | 2/2011 |
| KR | 10-1172629 | B1 | 8/2012 |
| KR | 10-2017-0054183 | A | 5/2017 |

OTHER PUBLICATIONS

Korean Notice of Allowance for related KR Application No. 10-2018-0132180 dated May 15, 2020 from Korean Intellectual Property Office.

* cited by examiner

FIG. 6
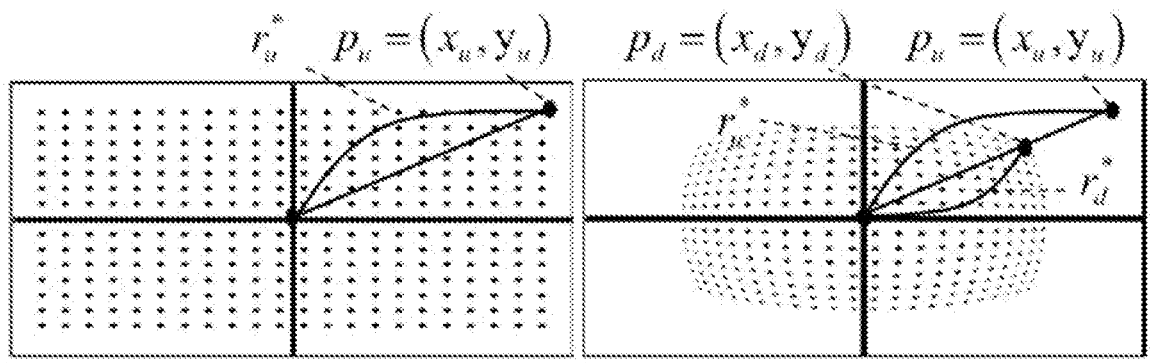
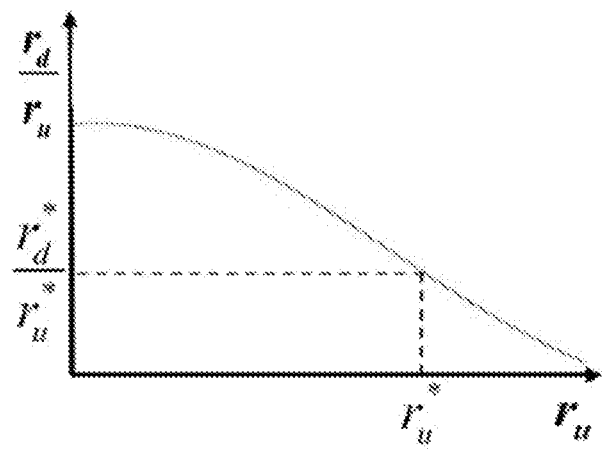
FIG. 7
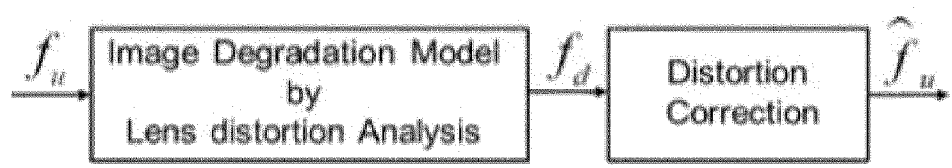

FIG. 9
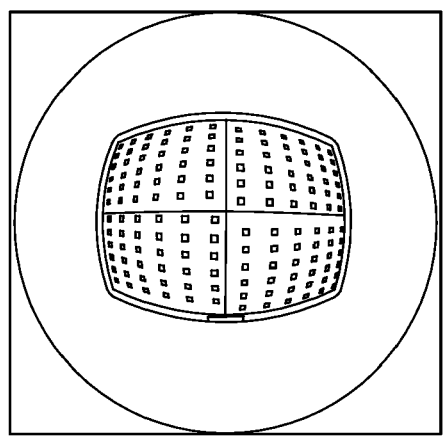
(a)
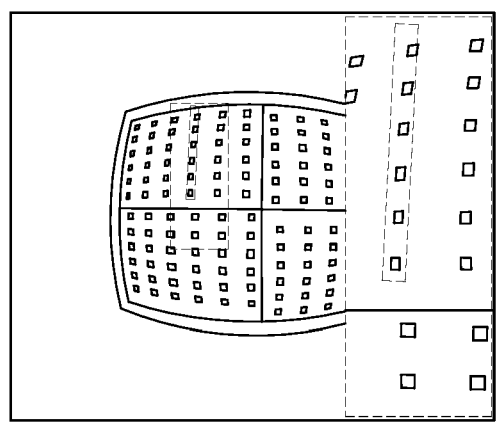
(b)
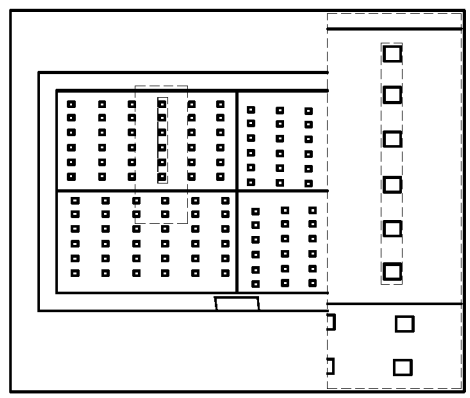
(c)

(a)          (b)

FIG. 11
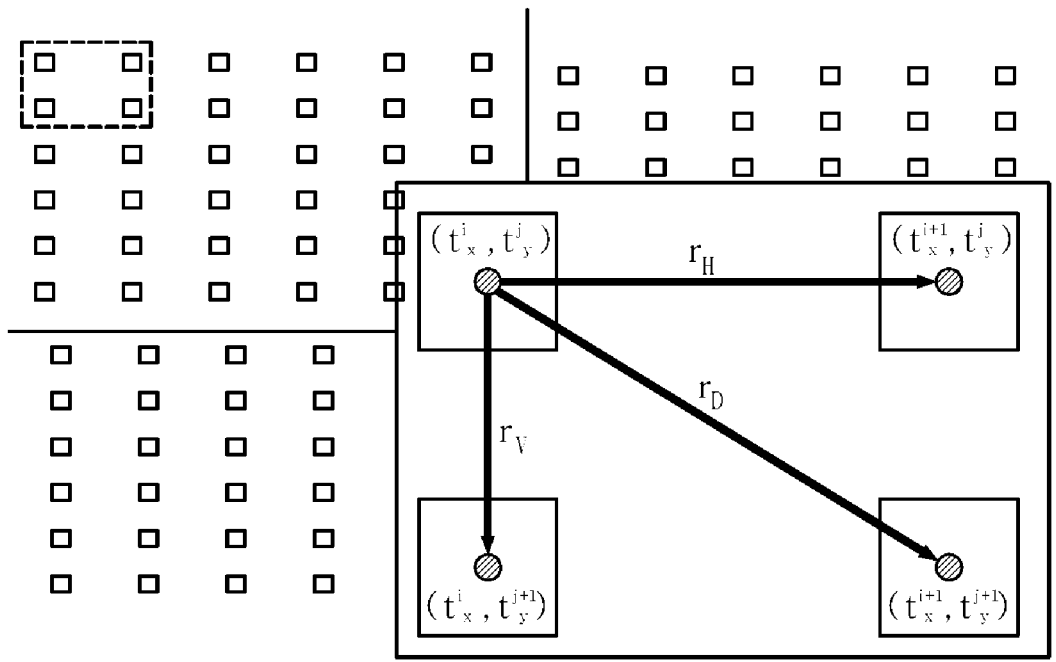
(a)
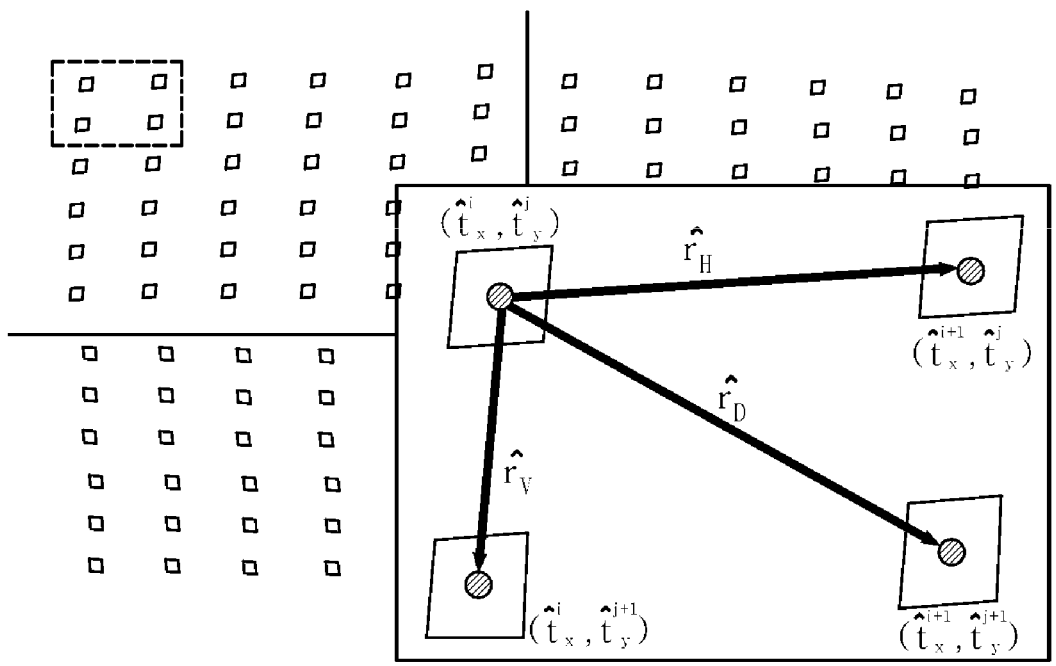
(b)

FIG. 14
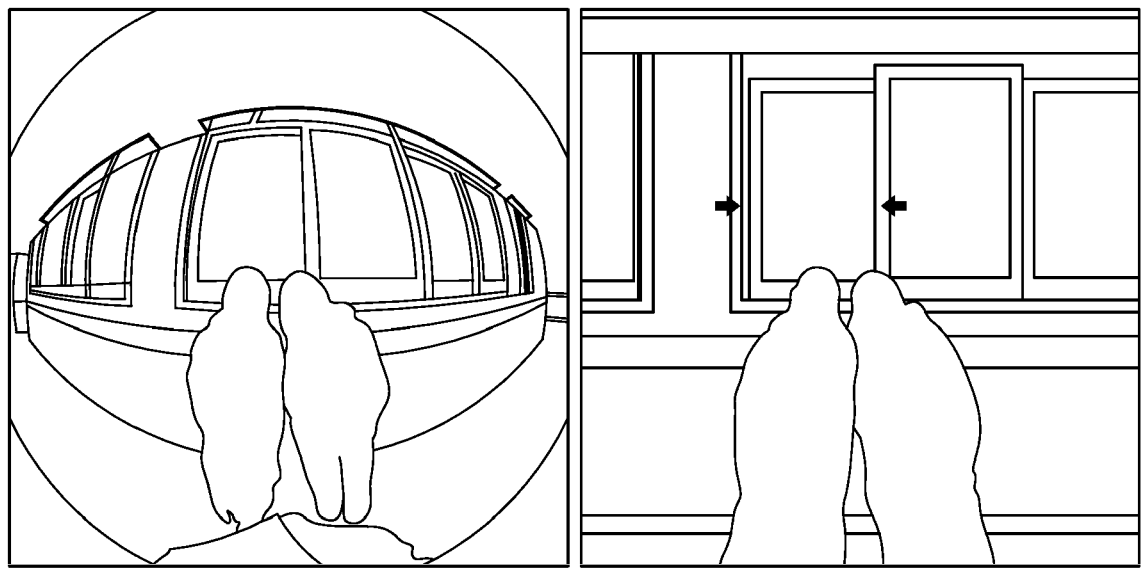
(a)  (b)
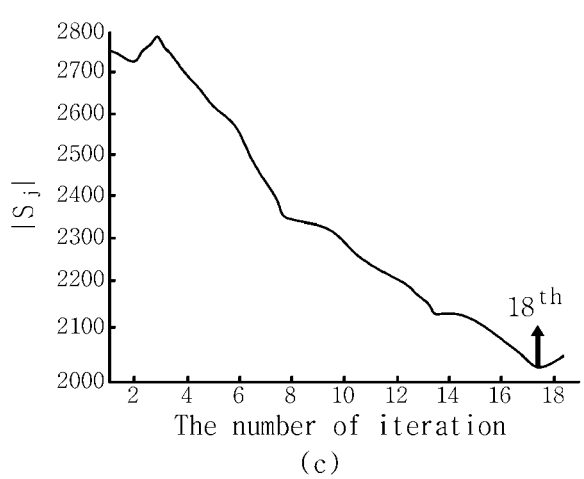
(c)
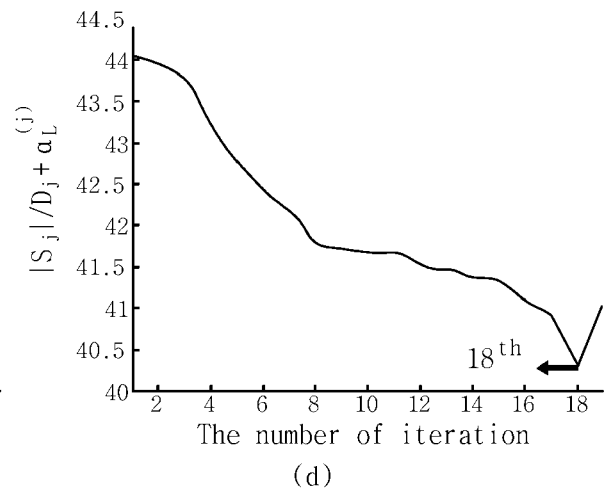
(d)

FIG. 15
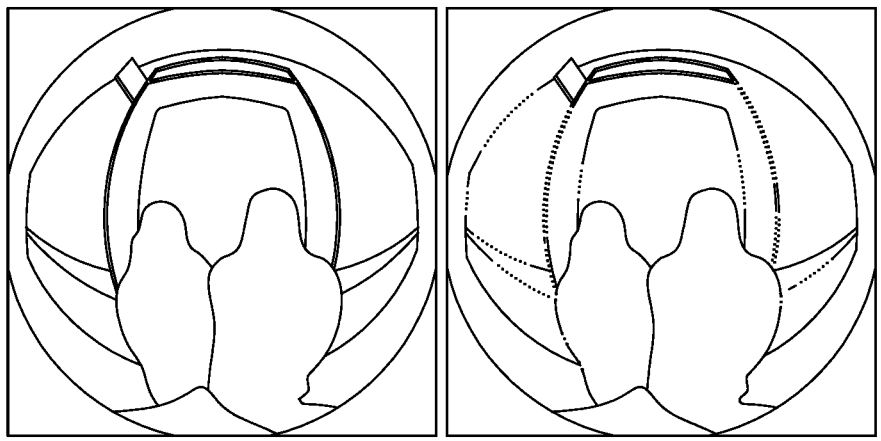
(a) (b)
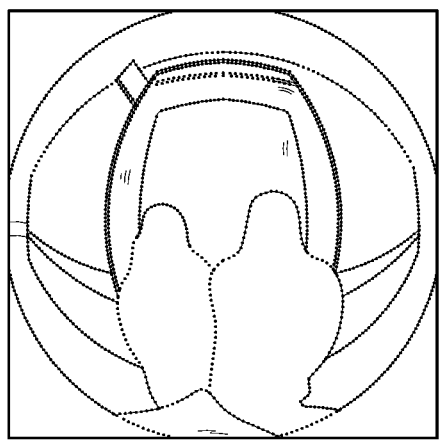
(c)
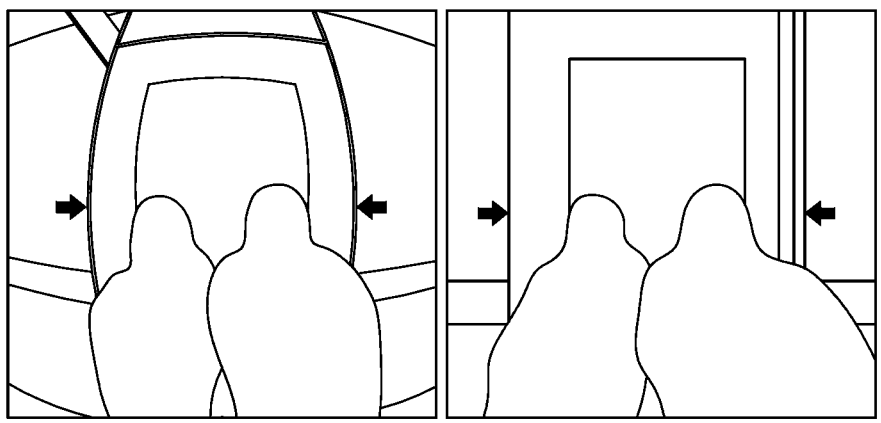
(d) (e)

FIG. 16
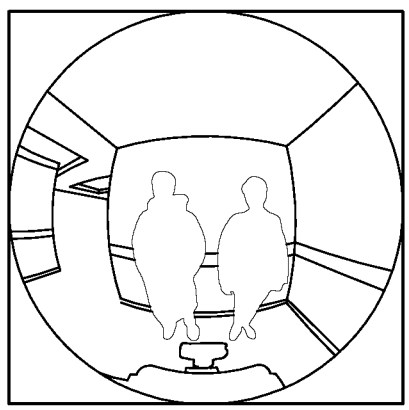
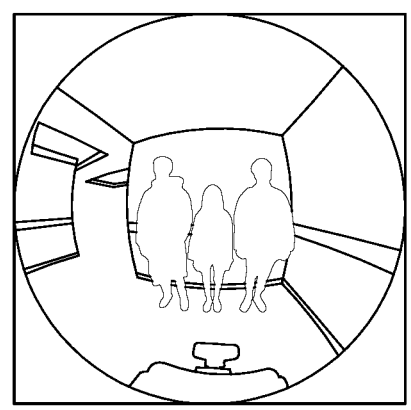
(a)
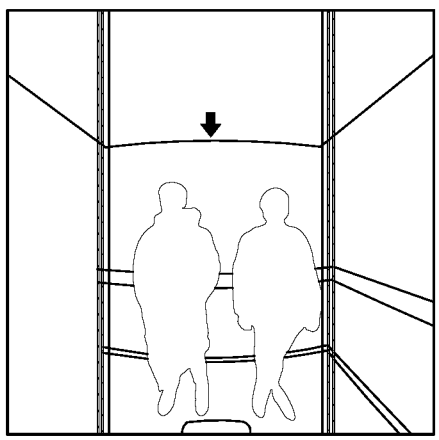
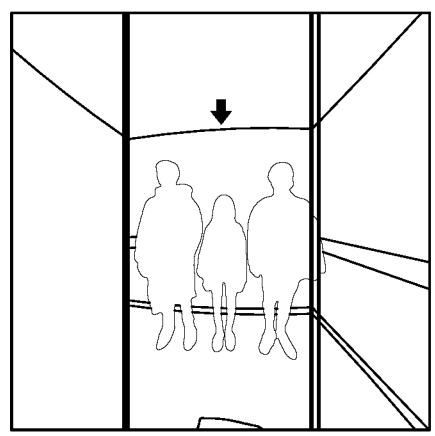
(b)
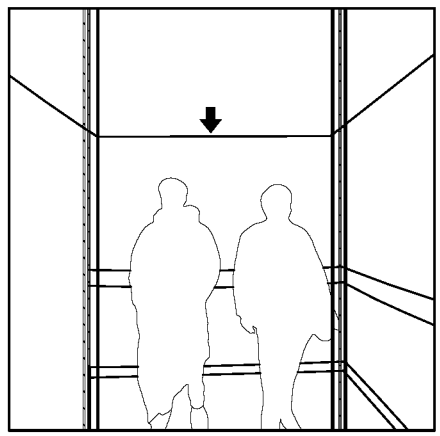
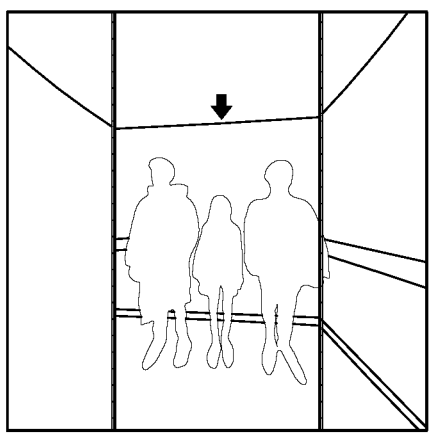
(c)

(a)           (b)

SYSTEM AND METHOD FOR CORRECTING IMAGE THROUGH ESTIMATION OF DISTORTION PARAMETER

ACKNOWLEDGEMENT

This work was supported by an Institute of Information & Communications Technology Planning & Evaluation (IITP) grant funded by the Korean government (MSIT) (No. 2014-0-00077, Development of global multi-target tracking and event prediction techniques based on real-time large-scale video analysis). This work was also supported by an Institute for Information & Communications Technology Promotion (IITP) grant funded by the Korean government (MSIT) (2017-0-00250, Intelligent Defense Boundary Surveillance Technology Using Collaborative Reinforced Learning of Embedded Edge Camera and Image Analysis).

CROSS-REFERENCE TO RELATED APPLICATION

This application claims priority to and the benefit of Korean Patent Application No. 10-2018-0132180, filed on Oct. 31, 2018, the disclosure of which is incorporated herein by reference in its entirety.

BACKGROUND

The present invention relates to image correction, and more particularly, to a system and method for correcting an image through estimation of a distortion parameter in which features are extracted from a distorted image and then the image is optimally corrected by repeatedly estimating a distortion parameter on the basis of optical characteristics.

The wide-angle lens, such as a fisheye lens, has a wider field of view (FOV) than a standard lens, and it is possible to obtain information of a wide area. However, a lens designed with a wide FOV excessively refracts light, and thus lens distortion may occur.

Lens distortion occurs in radial directions and is proportional to the distance from the center of an image. Due to lens distortion, distortion of image information occurs such as deformation of an object and bending of a straight line into a curved line. For this reason, performance of a system which identifies a specific object, analyzes circumstances, and determines a situation using image information may be degraded.

There are several methods for correcting such distortion. Representative distortion correction methods are based on a geometric projection model, a pattern, and estimation of a distortion parameter.

According to the method based on a geometric projection model, distortion is corrected by defining a lens distortion model according to geometric projection of a lens. In this case, a model of lens design and a focal length at the time of capturing the image are necessary to apply the method based on a geometric projection model for distortion correction. However, since it is not possible to accurately know an actual focal distance, accurate distortion correction is not possible.

According to the pattern-based method, distortion is corrected with a distortion rate which is estimated by using information on a distorted pattern and an ideal pattern. The pattern-based method involves photographing a pattern through each lens, and correction performance is affected by an environment in which the pattern is photographed and by accuracy in extracting pattern information.

According to the method based on estimation of a distortion parameter, distortion is corrected by estimating a distortion parameter on the basis of data learned from information extracted from a distorted image and information extracted from an undistorted image or by estimating a distortion parameter on the basis of a characteristic that distortion occurs in proportion to the distance from the origin. When a distortion parameter is estimated on the basis of learned data, performance varies according to the number of images used for prior learning. When a distortion parameter is estimated by using the characteristic that distortion occurs in proportion to the distance from the origin, it is necessary to separately set a threshold value according to an image size, and thus automatic distortion correction is not possible.

Consequently, it is necessary to develop a technology for optimally correcting distortion without optical experts' knowledge, such as lens design information, prior information which is used for distortion correction, such as a distortion pattern, and preprocessing technology for extracting pattern information.

PATENT DOCUMENTS

Korean Patent Registration No. 10-1172629
Korean Patent Registration No. 10-1014572
Japanese Patent Publication No. 2005-328570

SUMMARY

The present invention is directed to selecting an optimal distortion-corrected image through straight-line information of corrected images.

The present invention is directed to objectively correcting distortion on the basis of feature information extracted from a distorted image and optical characteristics without using lens information, pattern information, or learned data.

The present invention is directed to optimally correcting distortion through iterative estimation of a distortion parameter and an iterative distortion correction model.

The present invention is directed to maintaining constant performance by correcting distortion through a distortion parameter estimated on the basis of unique feature information of a measurement target.

The present invention is directed to providing a distortion correction system and method which may be applied to a system to which it is not possible to apply existing distortion correction methods.

The present invention is directed to applying a wide image system to extended application fields, such as a wide-area surveillance system and a high-end driver supporting system including a 360-degree augmented reality (AR) or virtual reality (VR) camera.

Objects of the present invention are not limited to those mentioned above, and other objects which have not been mentioned may be clearly understood by those of ordinary skill in the art from the following descriptions.

According to an aspect of the present invention, there is provided a system for correcting an image through estimation of a distortion parameter, the system including a distorted image receiver configured to receive a distorted image including one or more measurement targets, a feature point extractor configured to extract a plurality of feature points from each of the measurement targets, a feature point classifier configured to compare distances between the plurality of extracted feature points and the center point of the received distorted image and classify the one or more measurement targets as a distorted target and an undistorted target, a distortion parameter estimator configured to estimate a distortion parameter on the basis of standard deviations of a plurality of feature points of the classified distorted target and undistorted target, and an image corrector configured to correct the received distorted image on the basis of the estimated distortion parameter.

The one or more measurement targets may be people, and the plurality of feature points may include a center point of an eye corresponding to an iris of a corresponding person's left eye, a center point of an eye corresponding to an iris of the corresponding person's right eye, an end point of the corresponding person's nose, a left end point of the corresponding person's mouth, and a right end point of the corresponding person's mouth.

The feature point classifier may classify the one or more measurement targets as a distorted target and an undistorted target according to undistorted-target standard formulae given by Equations 8 and 9 below:

$$L_I = L_{i^*}, \text{ where } i^* = \underset{i \in \{1, \ldots, N_F\}}{\operatorname{argmin}} \|\mu_i - C\|, \quad \text{[Equation 8]}$$

where $L_I$ is an undistorted target, $L_i^*$ represents a measurement target at the shortest distance from the center point of a distorted image, $N_F$ represents the number of measurement targets, $\mu_i$ represents the average point of a plurality of feature points extracted from a measurement target, and $C=(x_c, y_c)$ is the center point of the received distorted image.

$$L_i = \{p_{LE}^i, p_{RE}^i, p_N^i, p_{LM}^i, p_{RM}^i\}, \text{ and}$$

$$\mu_i = \tfrac{1}{5}(p_{LE}^i + p_{RE}^i + p_N^i + p_{LM}^i + p_{RM}^i), \quad \text{[Equation 9]}$$

where $L_i$ represent feature points of a measurement target, $\mu_i$ represents the average point of a plurality of feature points, $p_{LE}^i$ represents the center point of a left eye corresponding to an iris of the left eye, $p_{RE}^i$ represents the center point of a right eye corresponding to an iris of the right eye, $p_N^i$ represents the end point of a nose, $p_{LM}^i$ represents the left end point of a mouth, $p_{RM}^i$ and represents the right end point of the mouth.

The distortion parameter estimator may calculate the distortion parameter to be estimated according to a distortion parameter formula given by Equation 10 below:

$$k^{(j)} = \frac{1}{N_F - 1} \sum_{i \neq i^*} \|\sigma_i^{(j)} - \sigma_{i^*}^{(j)}\|, \quad \text{[Equation 10]}$$

where $k^{(j)}$ represents a $j^{th}$ estimated distortion parameter, $N_F$ is the number of measurement targets, $\sigma_i^{(j)}$ represents the standard deviation of feature points of a distorted target, and $\sigma_i^{*(j)}$ represents the standard deviation of feature points of an undistorted target.

The system may further include an iterative corrector configured to output one or more repeatedly-corrected images by repeatedly estimating the distortion parameter and repeatedly correcting the corrected image until the corrected image satisfies a preset condition, and a final corrected-image selector configured to detect straight-line information including the number and length of straight lines in the one or more output images and select a final corrected image on the basis of the straight-line information.

The iterative corrector may repeatedly correct the corrected image according to iterative correction formulae given by Equations 11 and 12 below:

$$\hat{f}_u^{(j+1)} = \frac{1}{1 + k^{(j)} r^{(j)2}} \hat{f}_u^{(j)}, \text{ for } j = 0, 1, 2, \ldots, N_I, \quad \text{[Equation 11]}$$

where $\hat{f}_u^{(j+1)}$ represents a $j+1^{th}$ corrected image, $k^{(j)}$ represents a $j^{th}$ estimated distortion parameter, $r^{(j)}$ represents the distance between an arbitrary coordinate point of a $j^{th}$ corrected image and the center point of a received image, $\hat{f}_u^{(j)}$ represents the $j^{th}$ corrected image, and $N_I$ is the number of iterations.

$$r^{(j)} = \sqrt{(x_d^{(j)} - x_c)^2 + (y_d^{(j)} - y_c)^2}, \quad \text{[Equation 12]}$$

where $r^{(j)}$ represents the distance between an arbitrary coordinate point of a $j^{th}$ corrected image and the center point of a received image, $x_d^{(j)}$ and $y_d^{(j)}$ represent horizontal and vertical coordinates of the $j^{th}$ corrected image, and $x_c$ and $y_c$ represent coordinates of the center point of a distorted image.

The iterative corrector and the final corrected-image selector may operate according to a cost function given by Equation 14 below:

$$\hat{f}_u^* = \hat{f}_u^{(j^*)}, \text{ where } j^* = \min_j \left( \frac{|S_j|}{D_j} + \sigma_L^{(j)} \right), \quad \text{[Equation 14]}$$

where $\hat{f}_u^*$ is a final distortion-corrected image, $\hat{f}_u^{(j^*)}$ represents a $j^{*th}$ final distortion-corrected image, $D_j$ represents the total length of all straight lines in a $j^{th}$ repeatedly-corrected image, $S_j$ represent the set of straight lines extracted from the $j^{th}$ repeatedly-corrected image, $\sigma_L^{(j)}$ represents the standard deviation of feature points of the $j^{th}$ repeatedly-corrected image, and $|\cdot|$ the number of elements of the set.

According to another aspect of the present invention, there is provided a method of correcting an image through estimation of a distortion parameter, the method including: a distorted image receiving operation of receiving, by a distorted image receiver, a distorted image including one or more measurement targets; a feature point extraction operation of extracting, by a feature point extractor, a plurality of feature points from each of the measurement targets; a feature point classification operation of comparing, by a feature point classifier, distances between a plurality of extracted feature points and the center point of the received distorted image and classifying the one or more measurement targets as a distorted target and an undistorted target; a distortion parameter estimation operation of estimating, by a distortion parameter estimator, a distortion parameter on the basis of standard deviations of a plurality of feature points of the classified distorted target and undistorted target; and an image correction operation of correcting, by an image corrector, the received distorted image including the distorted target on the basis of the estimated distortion parameter.

The one or more measurement targets may be people, and the plurality of feature points may include a center point of an eye corresponding to an iris of a corresponding person's left eye, a center point of an eye corresponding to an iris of the corresponding person's right eye, an end point of the corresponding person's nose, a left end point of the corresponding person's mouth, and a right end point of the corresponding person's mouth.

The feature point classification operation may include classifying the one or more measurement targets as a distorted target and an undistorted target according to undistorted-target standard formulae given by Equations 8 and 9 below:

$$L_I = L_{i^*}, \text{ where } i^* = \min_{i \in \{1,...,N_p\}} \|\mu_i - C\|, \quad \text{[Equation 8]}$$

where $L_I$ is an undistorted target, $L_i^*$ represents a measurement target at the shortest distance from the center point of a distorted image, $N_F$ represents the number of measurement targets, $\mu_i$ the average point of a plurality of feature points extracted from a measurement target, and $C=(x_c, y_c)$ is the center point of the received distorted image.

$$L_i = \{p_{LE}^i, p_{RE}^i, p_N^i, p_{LM}^i, p_{RM}^i\}, \text{ and}$$

$$\mu_i = \tfrac{1}{5}(p_{LE}^i + p_{RE}^i + p_N^i + p_{LM}^i + p_{RM}^i), \quad \text{[Equation 9]}$$

where $L_i$ represent feature points of a measurement target, $\mu_i$ represents the average point of a plurality of feature points, $p_{LE}^i$ represents the center point of a left eye corresponding to an iris of the left eye, $p_{RE}^i$ represents the center point of a right eye corresponding to an iris of the right eye, $p_N^i$ represents the end point of a nose, $p_{LM}^i$ represents the left end point of a mouth, and $p_{RM}^i$ represents the right end point of the mouth.

The distortion parameter estimation operation may include calculating the distortion parameter to be estimated according to a distortion parameter formula given by Equation 10 below:

$$k^{(j)} = \frac{1}{N_F - 1} \sum_{i \neq i^*} \|\sigma_i^{(j)} - \sigma_{i^*}^{(j)}\|, \quad \text{[Equation 10]}$$

where $k^{(j)}$ represents a $j^{th}$ estimated distortion parameter, $N_F$ is the number of measurement targets, $\sigma_i^{(j)}$ represents the standard deviation of feature points of a distorted target, and $\sigma_i^{*(j)}$ represents the standard deviation of feature points of an undistorted target.

The method may further include an iterative correction operation of repeatedly estimating, by an iterative corrector, the distortion parameter and repeatedly correcting the corrected image until the corrected image satisfies a preset condition and outputting one or more repeatedly-corrected images, and a final corrected-image selection operation of detecting, by a final corrected-image selector, straight-line information including the number and length of straight lines in the one or more output images and selecting a final corrected image on the basis of the straight-line information.

The iterative correction operation may include repeatedly correcting the corrected image according to iterative correction formulae given by Equations 11 and 12 below:

$$\hat{f}_u^{(j+1)} = \frac{1}{1 + k^{(j)} r^{(j)2}} \hat{f}_u^{(j)}, \text{ for } j = 0, 1, 2, ..., N_I, \quad \text{[Equation 11]}$$

where $\hat{f}_u^{(j+1)}$ represents a $j+1^{th}$ corrected image, $k^{(j)}$ represents a $j^{th}$ estimated distortion parameter, $r^{(j)}$ represents the distance between an arbitrary coordinate point of a $j^{th}$ corrected image and the center point of a received image, $\hat{f}_u^{(j)}$ represents the $j^{th}$ corrected image, and $N_I$ is the number of iterations.

$$r^{(j)} = \sqrt{(x_d^{(j)} - x_c)^2 + (y_d^{(j)} - y_c)^2}, \quad \text{[Equation 12]}$$

where $r^{(j)}$ represents the distance between an arbitrary coordinate point of a $j^{th}$ corrected image and the center point of a received image, $x_d^{(j)}$ and $y_d^{(j)}$ represent horizontal and vertical coordinates of the $j^{th}$ corrected image, and $x_c$ and $y_c$ represent coordinates of the center point of a distorted image.

The iterative correction operation and the final corrected-image selection operation may be performed according to a cost function given by Equation 14 below:

$$\hat{f}_u^* = \hat{f}_u^{(j^*)}, \text{ where } j^* = \min_j \left( \frac{|S_j|}{D_j} + \sigma_L^{(j)} \right), \quad \text{[Equation 14]}$$

where $\hat{f}_u^*$ is a final distortion-corrected image, $\hat{f}_u^{(j^*)}$ represents a $j^{*th}$ final distortion-corrected image, $D_j$ represents the total length of all straight lines in a $j^{th}$ repeatedly-corrected image, $S_j$ represent the set of straight lines extracted from the $j^{th}$ repeatedly-corrected image, $\sigma_L^{(j)}$ represents the standard deviation of feature points of the $j^{th}$ repeatedly-corrected image, and $|\cdot|$ the number of elements of the set.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 6 is a set of diagrams showing a method of estimating a distortion parameter using a calibration pattern-based method according to an exemplary embodiment of the present invention;

FIG. 7 is a block diagram showing correction in a distorted image acquisition process according to an exemplary embodiment of the present invention and a general image restoration framework;

FIG. 9 shows a geometrically distorted image and images corrected by using two different correction methods according to an exemplary embodiment of the present invention;

FIG. 11 is a set of diagrams showing distances in an ideal pattern image and distances in a corrected pattern image with slight distortion according to an exemplary embodiment of the present invention;

FIG. 14 shows a final distortion-corrected image $\hat{f}^*_u$ and a number of straight lines $|S_j|$ based on Equation 14 according to an exemplary embodiment of the present invention;

FIG. 15 is a set of views showing straight-line detection results and distortion correction results based on the Flores method and a correction method of the present invention;

FIG. 16 is a set of views showing comparative experiment results according to an exemplary embodiment of the present invention.

DETAILED DESCRIPTION

In order to fully understand the present invention, operational advantages of the present invention, and objects achieved by implementing the present invention, the present invention will be described with reference to the accompanying drawings which illustrate preferred embodiments of the present invention and the content illustrated in the accompanying drawings. Features and advantages of the present invention will be more apparent from the following detailed description based on the accompanying drawings. Prior to this, terms and words used in this specification and claims are to be interpreted in relation to the technical idea of the present invention based on the principle that the inventor can properly define the concept of the term to describe his or her own invention in the best way, and the present invention should be interpreted in terms of meaning and concept. Detailed descriptions about related well-known functions and configurations that may obscure the subject matter of the present invention will be omitted.

Figure 1:
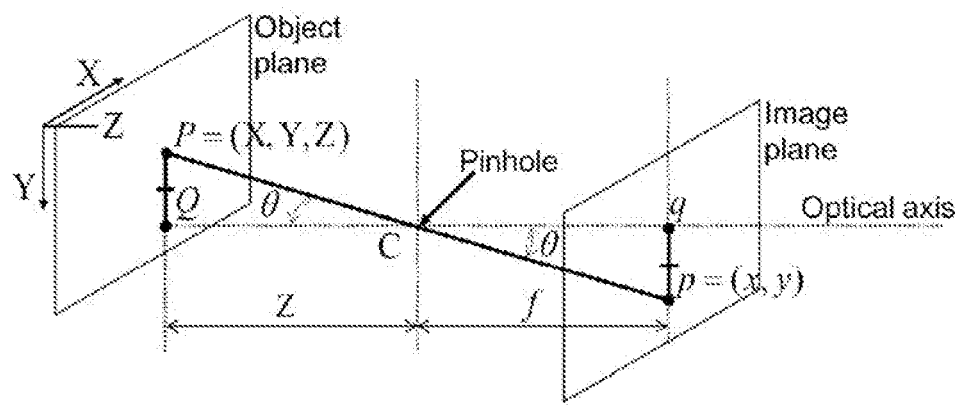
FIG. 1 is a diagram of a pinhole camera model in which it is possible to estimate a pinhole point C to be positioned at (0, 0, 0) in a three-dimensional (3D) coordinate system.
Figure 2:
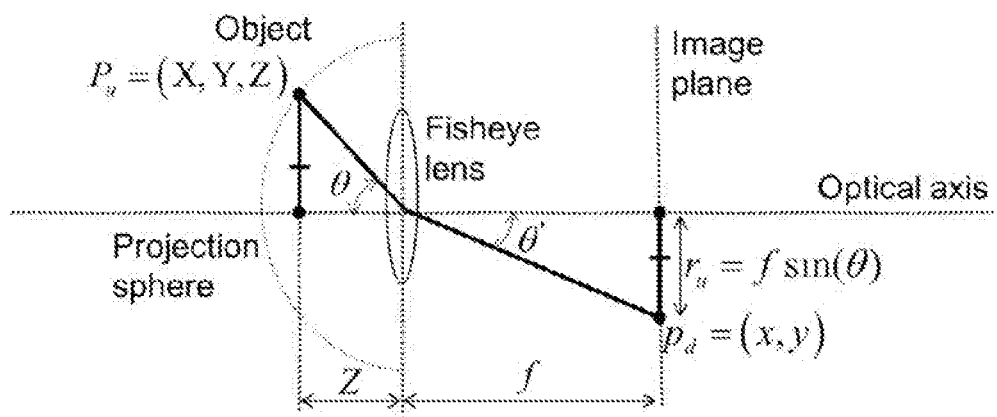
FIG. 2 is a diagram of a fisheye lens projection model.

FIG. 1 is a diagram of a pinhole camera model in which it is possible to estimate a pinhole point C to be positioned at (0, 0, 0) in a three-dimensional (3D) coordinate system, and FIG. 2 is a diagram of a fisheye lens projection model.

As shown in FIGS. 1 and 2, a pinhole camera model is defined as the relationship between a 3D space and a two-dimensional (2D) image plane projected through a pinhole. P=(X, Y, Z) in the 3D space is projected to p=(x, y) in the 2D image plane.

Two triangles PQC and pqC are similar to each other and thus have the relationship referred to as perspective projection as shown in Equation 1.

$$x = f\frac{X}{Z}, \text{ and } y = f\frac{Y}{Z}, \quad \text{[Equation 1]}$$

where P=(X, Y, Z) is an arbitrary point in a 3D space, and p=(x, y) is an arbitrary point in a 2D image plane.

Perspective projection is the theoretical basis for most camera systems having a thin lens. On the other hand, in a wide-angle or fisheye lens camera, projection from an object point to a projected point is a nonlinear function of an incidence angle of the object as shown in FIG. 2 and thus differs from perspective projection.

Light refracted by a fisheye lens results in barrel distortion, that is, curves, in an acquired image, and the shape of an object is distorted in radial directions. A projection region may be used to understand a fisheye lens projection model.

Figure 3:
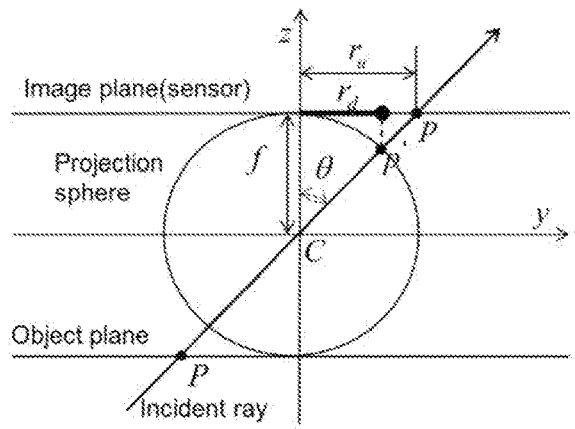
FIG. 3 is a diagram of an orthographic projection model of a fisheye lens image.

FIG. 3 is a diagram of an orthographic projection model of a fisheye lens image.

Referring to FIG. 3, a ray starting from a point P in an object plane comes to a center C at an incidence angle θ. When the center C is a pinhole rather than a fisheye lens, the image of the center C is formed at a point p at a radial distance $r_u$.

On the other hand, when the ray is refracted by a fisheye lens, the virtual image is formed at a point p' in a projection region, and a radial distance $r_d$ is determined according to orthographic projection onto an image plane.

FIG. 3 intuitively shows perspective and fisheye lens projection models using the same object and projection region having an image plane. As shown in FIG. 3, the fisheye lens projection point p' does not comply with perspective projection. In particular, the points p and p' are spatially different.

The spatial warping relationship of FIG. 3 is described with four projection models: (1) equidistant projection model, (2) equisolid projection model, (3) orthographic projection model, and (4) stereoscopic projection model.

Each projection model provides the relationship between the radial distance $r_u$ from the center to an undistorted point and the radial distance $r_d$ from the center to a distorted point. Since the radial distance $r_u$ is determined in the projection region by the angle θ of an incident ray, projection mapping functions for determining the radial distance $r_d$ may be defined as functions of θ. In FIG. 3, projection mapping functions which are the four projection models are defined as Equation 2 to Equation 5 below.

$$\text{Equidistant projection: } r_d = 2f(\theta) \quad \text{[Equation 2]}$$

$$\text{Equisolid projection: } r_d = f(\sin(\theta/2)) \quad \text{[Equation 3]}$$

$$\text{Orthographic projection: } r_d = f(\sin(\theta)) \quad \text{[Equation 4]}$$

$$\text{Stereoscopic projection: } r_d = 2f(\tan(\theta/2)) \quad \text{[Equation 5]}$$

In the above equations, f, θ, and $r_d$ are the focal length, incidence angle, and distance between the center point in a distorted image and a projected point, respectively.

A system and method for correcting an image through estimation of a distortion parameter according to exemplary embodiments of the present invention will be described below on the basis of the projection models.

Figure 4:
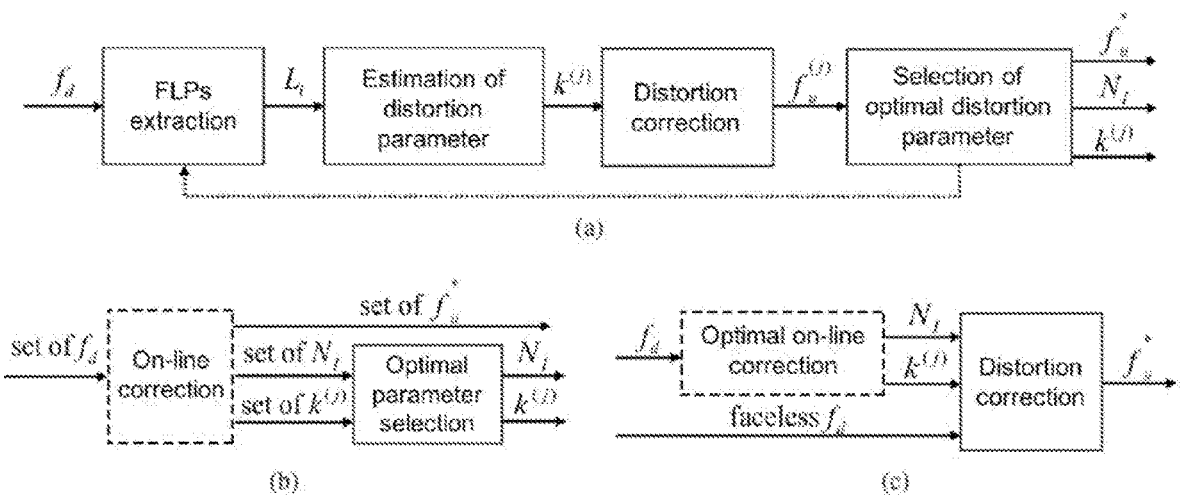
FIG. 4 is a set of block diagrams showing image-based restoration algorithms proposed to correct fisheye lens distortion according to an exemplary embodiment of the present invention.

FIG. 4 is a set of block diagrams showing image-based restoration algorithms proposed to correct fisheye lens distortion according to an exemplary embodiment of the present invention. FIG. 4A is a block diagram showing an online correction algorithm based on a received image including feature points, FIG. 4B is a block diagram showing an online correction algorithm based on a plurality of images including feature points, and FIG. 4C is a block diagram showing an offline correction algorithm for using pre-calibration on a general received image which does not include feature points.

As shown in FIG. 4, the present invention proposes an image-based distortion parameter estimation method for selecting an optimally corrected image using features of a received distorted image. The method (1) does not require a pre-designated lens parameter or a specific calibration pattern for prior information in a process of estimating a distortion parameter and selecting an optimally corrected image and (2) allows both online correction and offline correction as shown in FIG. 4, and thus may be applied to various environments.

This is described in further detail below.

Figure 5:
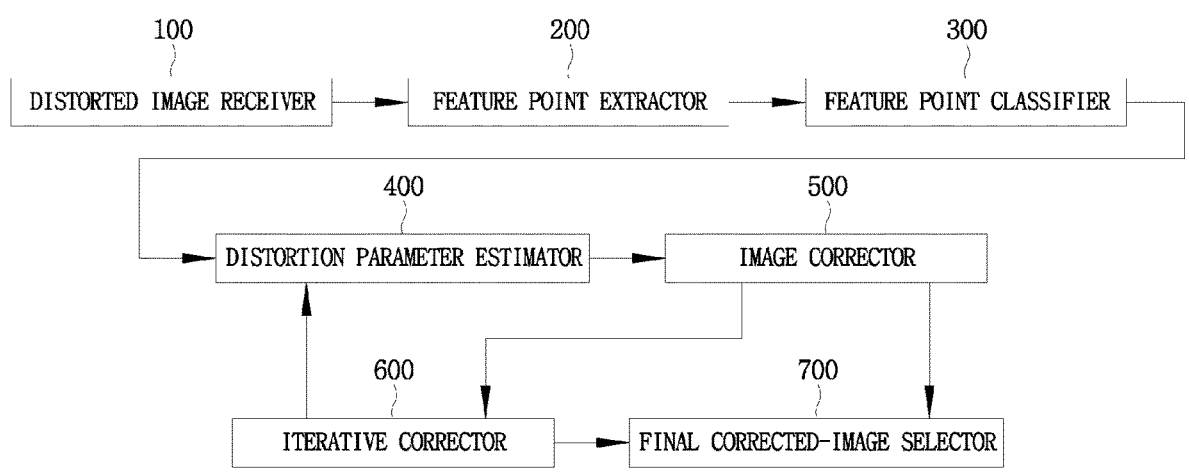
FIG. 5 is a block diagram of a system for correcting an image through estimation of a distortion parameter according to an exemplary embodiment of the present invention.

FIG. 5 is a block diagram of a system for correcting an image through estimation of a distortion parameter according to an exemplary embodiment of the present invention. FIG. 6 is a set of diagrams showing a method of estimating a distortion parameter using a calibration pattern-based method according to an exemplary embodiment of the present invention. FIG. 7 is a block diagram showing correction in a distorted image acquisition process according to an exemplary embodiment of the present invention and a general image restoration framework.

Referring to FIGS. 5 to 7, first, a system for correcting an image through estimation of a distortion parameter according to an exemplary embodiment of the present invention may include a distorted image receiver 100, a feature point extractor 200, a feature point classifier 300, a distortion parameter estimator 400, and an image corrector 500.

The distorted image receiver 100 may receive a distorted image including one or more measurement targets. This may be a component for receiving a distorted image including one or more measurement targets to correct distortion using objective feature information. The one or more measurement targets in the received distorted image may be people. Meanwhile, the distorted image receiver 100 may receive a distorted image through a wide-angle lens, such as a fisheye lens.

The feature point extractor 200 may extract a plurality of feature points from each measurement target. This may be a component for extracting unique feature information from a measurement target in a distorted image rather than lens information, pattern information, or learned data. When the measurement target is a person, the plurality of extracted feature points may include the center point of an eye corresponding to the iris of his or her left eye, the center point of an eye corresponding to the iris of his or her right eye, the end point of his or her nose, the left end point of his or her mouth, and the right end point of his or her mouth. When several people are measurement targets, a plurality of feature points may be extracted from each person.

In extracting feature points from the measurement target, it is possible to use multi-task deep cascaded convolutional neural network.

The feature point classifier 300 may classify the one or more measurement targets as a distorted target and an undistorted target by comparing distances between a plurality of extracted feature points and the center point of the received distorted image with each other. This may be the criterion for classification into a distorted target and an undistorted target based on the characteristic of a wide-angle lens that the degree of distortion increases as the distance from the center of an image increases.

The characteristic of a wide-angle lens that the degree of distortion increases as the distance from the center of an image increases may be described with reference to FIG. 6.

FIG. 6 is a set of diagrams showing a method of estimating a distortion parameter using a calibration pattern-based method according to an exemplary embodiment of the present invention. FIG. 6A is a diagram showing a calibration pattern, FIG. 6B is a diagram showing a pattern image projected through a fisheye lens, and FIG. 6C is a diagram showing a distortion curve ($r_d/r_u$ versus $r_u$).

As shown in FIG. 6, according to the pattern-based method, it is possible to show the relationship of $r_d/r_u$ versus $r_u$ using a distortion curve. According to the pattern-based method, it is possible to calculate an accurate distortion rate only when there is one pair of an undistorted point and a distorted point. As shown in FIG. 6B, since points of a distorted image are distributed in a limited region, it is not possible to estimate the distortion rate of an overall image.

To solve this problem, according to a rational function-based distortion model, it is possible to define the relationship between a distorted point and an undistorted point by using a polynomial function as shown in Equation 6 below.

$$\begin{bmatrix} x_d - x_c \\ y_d - y_c \end{bmatrix} = L(r_u)\begin{bmatrix} x_u - x_c \\ y_u - y_c \end{bmatrix} \quad \text{[Equation 6]}$$

$$L(r) = 1 + k_1 r^2 + k_2 r^4 + \ldots$$

$$r_u = \sqrt{(x_u - x_c)^2 + (y_u - y_c)^2},$$

where $(x_u, y_u)$, $(x_d, y_d)$, and $(x_c, y_c)$ represent coordinates of an undistorted point, a distorted point, and the center point of an image, respectively. The undistorted point has coordinate values obtained by dividing the coordinate values of the distorted point by $L(r_u)$ and is given by Equation 7 below.

$$\begin{bmatrix} x_u - x_c \\ y_u - y_c \end{bmatrix} = \frac{1}{L(r_u)}\begin{bmatrix} x_d - x_c \\ y_d - y_c \end{bmatrix} \quad \text{[Equation 7]}$$

When distortion parameters $\{k_1, k_2, \ldots\}$ are estimated, a distorted point may be calculated from an undistorted point by using Equation 6.

Since there is little improvement between distortion correction with a secondary or higher model and distortion correction with a primary model, it is possible to use the distortion model $L(r_u) = 1 + k_1 r_d^2$ given by Equation 6 according to the primary model which requires a small amount of calculation. Modeling of a lens other than a fisheye lens is not included in this task, and thus accuracy in another distortion model is not additionally analyzed.

Referring to FIG. 6C, the amount of distortion is the least at the center of the image and increases exponentially away from the center. For this reason, in the present invention, it is possible to provide the criterion for classification into a distorted target and an undistorted target by comparing the distances between the center point of a received distorted image and a plurality of feature points extracted from one or more measurement targets with each other. Here, the amount of distortion may represent the degree of distortion.

Meanwhile, the feature point classifier 300 may classify the one or more measurement targets as a distorted target and an undistorted target according to undistorted-target standard formulae given by Equations 8 and 9 below.

$$L_I = L_{i^*}, \text{ where } i^* = \underset{i \in \{1, \ldots, N_F\}}{\operatorname{argmin}} \|\mu_i - C\|, \quad \text{[Equation 8]}$$

where $L_I$ is an undistorted target, $L_i^*$ represents a measurement target at the shortest distance from the center point of a distorted image, $N_F$ represents the number of measurement targets, $\mu_i$ the average point of a plurality of feature points extracted from a measurement target, and $C=(x_c, y_c)$ is the center point of the received distorted image.

$$L_i = \{p_{LE}^i, p_{RE}^i, p_N^i, p_{LM}^i, p_{RM}^i\}, \text{ and}$$

$$\mu_i = \tfrac{1}{5}(p_{LE}^i + p_{RE}^i + p_N^i + p_{LM}^i + p_{RM}^i), \qquad \text{[Equation 9]}$$

where $L_i$ represent feature points of a measurement target, $\mu_i$ represents the average point of a plurality of feature points, $p_{LE}^i$ represents the center point of a left eye corresponding to the iris thereof, $p_{RE}^i$ represents the center point of a right eye corresponding to the iris thereof, $p_N^i$ represents the end point of a nose, $p_{LM}^i$ represents the left end point of a mouth, and $p_{RM}^i$ represents the right end point of the mouth.

When $N_F$ is the number of measurement targets, $L_i$ ($i=1, \ldots, N_F$) may be a set of a plurality of feature points extracted from a measurement target.

More specifically, according to the undistorted-target standard formulae given by Equations 8 and 9, a measurement target closest to the center point of a received distorted image among several measurement targets in the received distorted image may be determined to be an undistorted target, and all other measurement targets may be determined to be distorted targets.

Here, $L_i$ may include $p_{LE}^i$ the center point of a left eye corresponding to the iris thereof, $p_{RE}^i$ the center point of a right eye corresponding to the iris thereof, $p_N^i$ the end point of a nose, $p_{LM}^i$ the left end point of a mouth, $p_{RM}^i$ an the right end point of the mouth.

$\mu_i$ may be the average point of the plurality of feature points.

Meanwhile, in equations of the present invention, all specific points (an undistorted point, a distorted point, a center point, etc.) may be coordinate points.

The distortion parameter estimator 400 may estimate a distortion parameter on the basis of standard deviations of a plurality of feature points of a classified distorted target and undistorted target. This may be a component for estimating a distortion parameter using a standard deviation which is an important factor for determining the amount of distortion.

Meanwhile, the distortion parameter estimator 400 may estimate a distortion parameter according to a distortion parameter formula given by Equation 10 below.

$$k^{(j)} = \frac{1}{N_F - 1} \sum_{i \neq i^*} \|\sigma_i^{(j)} - \sigma_{i^*}^{(j)}\|, \qquad \text{[Equation 10]}$$

where $k^{(j)}$ represents a $j^{th}$ estimated distortion parameter, $N_F$ is the number of measurement targets, $\sigma_i^{(j)}$ represents the standard deviation of feature points of a distorted target, and $\sigma_i^{*(j)}$ represents the standard deviation of feature points of an undistorted target.

As shown in FIG. 6B, as the distance from the center of an image increases, feature points of a measurement target get closer to each other. Accordingly, the standard deviations of a distorted target and an undistorted target are reduced as the distance from the center of the image increases. For this reason, the standard deviations of a distorted target and an undistorted target may be an important factor for determining the amount of distortion.

The image corrector 500 may correct the received distorted image on the basis of an estimated distortion parameter. This may be a component for accurately detecting the degree of correction on the basis of a distortion parameter, which has been estimated in consideration of the amount of distortion and the like, and optimally correcting a distorted image.

However, since lens distortion is spatially variable, image information is lost when distortion occurs. Therefore, a process may be additionally required to output a plurality of images through repeated image correction and select an optimally corrected image.

Meanwhile, the system for correcting an image through estimation of a distortion parameter according to an exemplary embodiment of the present invention may further include an iterative corrector 600 and a final corrected-image selector 700.

The iterative corrector 600 may output one or more repeatedly-corrected images by repeatedly estimating a distortion parameter and repeatedly correcting a corrected image until the corrected image satisfies a preset condition. This may be a component for outputting multiple candidate images by repeatedly estimating a distortion parameter and repeatedly using a distortion correction model on the basis of the distortion parameter in order to select an optimally corrected image.

Meanwhile, the iterative corrector 600 may repeatedly correct a corrected image according to iterative correction formulae given by Equations 11 and 12 below.

$$\hat{f}_u^{(j+1)} = \frac{1}{1 + k^{(j)} r^{(j)2}} \hat{f}_u^{(j)}, \text{ for } j = 0, 1, 2, \ldots, N_I, \qquad \text{[Equation 11]}$$

where $\hat{f}_u^{(j+1)}$ represents a $j+1^{th}$ corrected image, $k^{(j)}$ represents a $j^{th}$ estimated distortion parameter, $r^{(j)}$ represents the distance between an arbitrary coordinate point of a $j^{th}$ corrected image and the center point of a received image, $\hat{f}_u^{(j)}$ represents the $j^{th}$ corrected image, and $N_I$ is the number of iterations.

$$r^{(j)} = \sqrt{(x_d^{(j)} - x_c)^2 + (y_d^{(j)} - y_c)^2}, \qquad \text{[Equation 12]}$$

where $r^{(j)}$ represents the distance between an arbitrary coordinate point of a $j^{th}$ corrected image and the center point of a received image, $x_d^{(j)}$ and $y_d^{(j)}$ represent horizontal and vertical coordinates of the $j^{th}$ corrected image, and $x_c$ and $y_c$ represent coordinates of the center point of a distorted image.

The final corrected-image selector 700 may detect straight-line information including the number and length of straight lines in one or more output images and select a final corrected-image on the basis of the detected straight-line information. This may be a component for selecting an optimally corrected image by applying an optical characteristic to geometric distortion.

More specifically, the correction algorithm of the present invention may be used in a general image restoration framework. In other words, a distorted image is considered a degraded version of an ideal undistorted scene, and a corrected image is obtained by estimating the ideal scene through an image restoration process, which is a distortion correction operation of this task. The image restoration framework is shown in FIG. 7.

In FIG. 7, $f_u$ is an ideal undistorted scene, $f_d$ is a distorted image acquired through a fisheye lens, and $\hat{f}_u$ is an image estimated by correcting the distorted image.

Ideally, a corrected image satisfies calculation of an ideal image given by Equation 13 below.

$$\|f_u - \hat{f}_u\| = 0 \qquad \text{[Equation 13]}$$

In Equation 13, $f_u$ is an ideal undistorted scene, and $\hat{f}_u$ is an image estimated by correcting the distorted image.

However, lens distortion is spatial warping, and thus it is not possible to accurately model lens distortion through a single image performance degradation task. Therefore, Equation 13 is not satisfied in practice. Accordingly, an optimally corrected image is selected from among one or more repeatedly-corrected images which are output through several iterative calculations of Equation 11 instead of the cost function of Equation 13 for comparing images with each other. In the selection process, an optical characteristic which is robust against geometric distortion is used.

More specifically, in the process of projecting a 3D space into a 2D image, a straight line is refracted into a curve due to radial distortion of a lens. Accordingly, a correction process involves making the curve as straight as possible, and thus a final corrected-image may be selected on the basis of straight-line information.

However, when an optimally corrected image is selected with only the straight-line information, a line directed toward a distortion center is excessively corrected. Therefore, the final corrected-image selector 700 may select a final corrected-image satisfying the cost function of Equation 14, which includes a total length $D_j$ of all straight lines in a $j^{th}$ repeatedly-corrected image and a number $|S_j|$ of straight lines extracted from the $j^{th}$ repeatedly-corrected image. Meanwhile, Equation 14 below may be a preset condition of the iterative corrector 600.

$$\hat{f}_u^* = \hat{f}_u^{(j^*)}, \text{ where } j^* = \min_j \left( \frac{|S_j|}{D_j} + \sigma_L^{(j)} \right),$$ [Equation 14]

where $\hat{f}_u^*$ is a final distortion-corrected image, $\hat{f}_u^{(j^*)}$ represents a $j^{*th}$ final distortion-corrected image, $D_j$ represents the total length of all straight lines in a $j^{th}$ repeatedly-corrected image, $S_j$ represents the set of straight lines extracted from the $j^{th}$ repeatedly-corrected image, $\sigma_L^{(j)}$ represents the standard deviation of feature points of the $j^{th}$ repeatedly-corrected image, and |•| the number of elements of the set.

Since the final corrected-image is selected by using feature points and straight-line information in combination according to Equation 14, it is possible to prevent a straight line from being excessively corrected when the straight line is directed toward a distortion center in the image.

Figure 8:
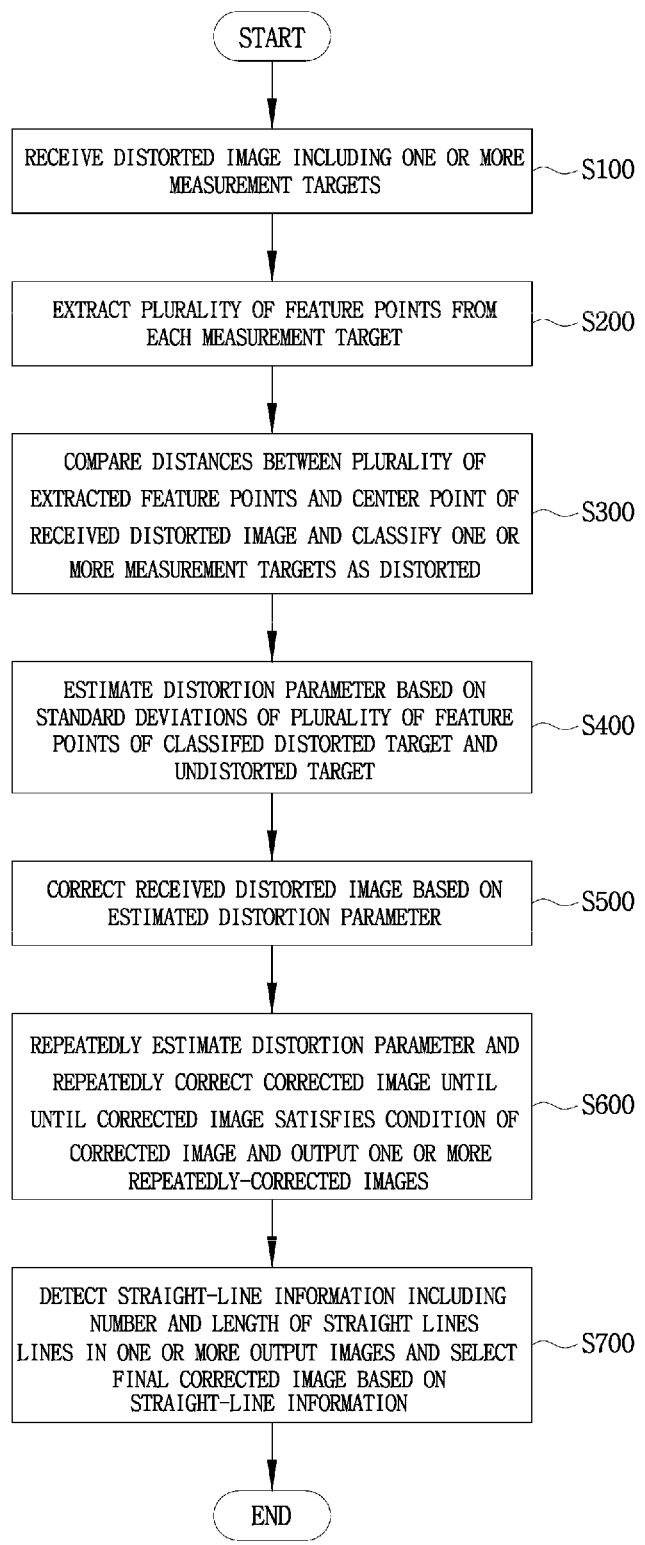
FIG. 8 is a flowchart illustrating a method of correcting an image through estimation of a distortion parameter according to an exemplary embodiment of the present invention.

FIG. 8 is a flowchart illustrating a method of correcting an image through estimation of a distortion parameter according to an exemplary embodiment of the present invention.

Referring to FIG. 8, a method of correcting an image through estimation of a distortion parameter according to an exemplary embodiment of the present invention may include a distorted image receiving operation S100, a feature point extraction operation S200, a feature point classification operation S300, a 3distortion parameter estimation operation S400, and an image correction operation S500.

In the distorted image receiving operation S100, the distorted image receiver 100 may receive a distorted image including one or more measurement targets. This may be an operation for receiving a distorted image including one or more measurement targets to correct distortion using objective feature information. The one or more measurement targets in the received distorted image may be people. Meanwhile, in the distorted image receiving operation S100, a distorted image may be received through a wide-angle lens, such as a fisheye lens.

In the feature point extraction operation S200, the feature point extractor 200 may extract a plurality of feature points from each measurement target. This may be an operation for extracting unique feature information from a measurement target in a distorted image rather than lens information, pattern information, or learned data. When the measurement target is a person, the plurality of extracted feature points may include the center point of an eye corresponding to the iris of his or her left eye, the center point of an eye corresponding to the iris of his or her right eye, the end point of his or her nose, the left end point of his or her mouth, and the right end point of his or her mouth. When several people are measurement targets, a plurality of feature points may be extracted from each person.

In extracting feature points from the measurement target, it is possible to use multi-task deep cascaded convolutional neural network.

In the feature point classification operation S300, the feature point classifier 300 may classify the one or more measurement targets as a distorted target and an undistorted target by comparing distance values between a plurality of extracted feature points and the center point of the received distorted image with each other. This may be the criterion for classification into a distorted target and an undistorted target based on the characteristic of a wide-angle lens that the degree of distortion increases as the distance from the center of an image increases.

Meanwhile, in the feature point classification operation S300, the one or more measurement targets may be classified as a distorted target and an undistorted target according to undistorted-target standard formulae given by Equations 8 and 9 below.

$$L_I = L_{i^*}, \text{ where } i^* = \underset{i \in \{1, \ldots, N_F\}}{\mathrm{argmin}} \|\mu_i - C\|,$$ [Equation 8]

where $L_I$ is an undistorted target, $L_i^*$ represents a measurement target at the shortest distance from the center point of a distorted image, $N_F$ represents the number of measurement targets, $\mu_i$ represents the average point of a plurality of feature points extracted from a measurement target, and $C=(x_c, y_c)$ is the center point of the received distorted image.

$$L_i = \{p_{LE}^i, p_{RE}^i, p_N^i, p_{LM}^i, p_{RM}^i\}, \text{ and}$$

$$\mu_i = \frac{1}{5}(p_{LE}^i + p_{RE}^i + p_N^i + p_{LM}^i + p_{RM}^i),$$ [Equation 9]

where $L_i$ represent feature points of a measurement target, $\mu_i$ represents the average point of a plurality of feature points, $p_{LE}^i$ represents the center point of a left eye corresponding to the iris thereof, $p_{RE}^i$ represents the center point of a right eye corresponding to the iris thereof, $p_N^i$ represents the end point of a nose, $p_{LM}^i$ a represents the left end point of a mouth, and $p_{RM}^i$ represents the right end point of the mouth.

When $N_F$ is the number of measurement targets, $L_i$ ($i=1, \ldots, N_F$) may be a set of a plurality of feature points extracted from a measurement target.

More specifically, according to the undistorted-target standard formulae given by Equations 8 and 9, a measurement target closest to the center point of a received distorted image among several measurement targets in the received distorted image may be determined to be an undistorted target, and all other measurement targets may be determined to be distorted targets.

Here, $L_i$ may include $p_{LE}^i$ the center point of a left eye corresponding to the iris thereof, $p_{RE}^i$ the center point of a right eye corresponding to the iris thereof, $p_N^i$ the end point of a nose, $p_{LM}^i$ the left end point of a mouth, and $p_{RM}^i$ the right end point of the mouth.

$\mu_i$ may be the average point of the plurality of feature points.

Meanwhile, in equations described in the present invention, all specific points (an undistorted point, a distorted point, a center point, etc.) may be coordinate points.

In the distortion parameter estimation operation S400, the distortion parameter estimator 400 may estimate a distortion parameter on the basis of standard deviations of a plurality of feature points of a classified distorted target and undistorted target. This may be an operation for estimating a distortion parameter using a standard deviation which is an important factor for determining the amount of distortion.

Meanwhile, in the distortion parameter estimation operation S400, a distortion parameter may be estimated according to a distortion parameter formula given by Equation 10 below.

$$k^{(j)} = \frac{1}{N_F - 1} \sum_{i \neq i^*} \|\sigma_i^{(j)} - \sigma_{i^*}^{(j)}\|, \quad \text{[Equation 10]}$$

where $k^{(j)}$ represents a $j^{th}$ estimated distortion parameter, $N_F$ is the number of measurement targets, $\sigma_i^{(j)}$ represents the standard deviation of feature points of a distorted target, and $\sigma_i^{*(j)}$ represents the standard deviation of feature points of an undistorted target.

In the image correction operation S500, the image corrector 500 may correct the received distorted image on the basis of the estimated distortion parameter. This may be an operation for accurately detecting the degree of correction on the basis of a distortion parameter, which has been estimated in consideration of the amount of distortion and the like, and optimally correcting a distorted image.

However, since lens distortion is spatially variable, image information is lost when distortion occurs. Therefore, a process may be additionally required to output a plurality of images through repeated image correction and select an optimally corrected image.

Meanwhile, the method of correcting an image through estimation of a distortion parameter according to an exemplary embodiment of the present invention may further include an iterative correction operation S600 and a final corrected-image selection operation S700.

In the iterative correction operation S600, the iterative corrector 600 may output one or more repeatedly-corrected images by repeatedly estimating a distortion parameter and repeatedly correcting a corrected image until the corrected image satisfies a preset condition. This may be an operation for outputting multiple candidate images by repeatedly estimating a distortion parameter and repeatedly using a distortion correction model on the basis of the distortion parameter in order to select an optimally corrected image.

Meanwhile, in the iterative correction operation S600, a corrected image may be repeatedly corrected according to iterative correction formulae given by Equations 11 and 12 below.

$$\hat{f}_u^{(j+1)} = \frac{1}{1 + k^{(j)} r^{(j)2}} \hat{f}_u^{(j)}, \text{ for } j = 0, 1, 2, \ldots, N_I, \quad \text{[Equation 11]}$$

where $\hat{f}_u^{(j+1)}$ represents a $j+1^{th}$ corrected image, $k^{(j)}$ represents a $j^{th}$ estimated distortion parameter, $r^{(j)}$ represents the distance between an arbitrary coordinate point of a $j^{th}$ corrected image and the center point of a received image, $\hat{f}_u^{(j)}$ represents the $j^{th}$ corrected image, and $N_I$ is the number of iterations.

$$r^{(j)} = \sqrt{(x_d^{(j)} - x_x)^2 + (y_d^{(j)} - y_c)^2}, \quad \text{[Equation 12]}$$

where $r^{(j)}$ represents the distance between an arbitrary coordinate point of a $j^{th}$ corrected image and the center point of a received image, $x_d^{(j)}$ and $y_d^{(j)}$ represent horizontal and vertical coordinates of the $j^{th}$ corrected image, and $x_c$ and $y_c$ represent coordinates of the center point of a distorted image.

In the final corrected-image selection operation S700, the final corrected-image selector 700 may detect straight-line information including the number and length of straight lines in one or more output images and select a final corrected-image on the basis of the detected straight-line information. This may be an operation for selecting an optimally corrected image by applying an optical characteristic to geometric distortion.

More specifically, in the process of projecting a 3D space into a 2D image, a straight line is refracted into a curve due to radial distortion of a lens. Accordingly, a correction process involves making the curve as straight as possible, and thus a final corrected-image may be selected on the basis of straight-line information.

However, when an optimally corrected image is selected with only the straight-line information, a line directed toward a distortion center is excessively corrected. Therefore, in the final corrected-image selection operation S700, a final corrected-image satisfying the cost function of Equation 14, which includes a total length $D_j$ of all straight lines in a $j^{th}$ repeatedly-corrected image and a number $|S_j|$ of straight lines extracted from the $j^{th}$ repeatedly-corrected image, may be selected. Meanwhile, Equation 14 below may be a preset condition of the iterative correction operation S600.

$$\hat{f}_u^* = \hat{f}_u^{(j^*)}, \text{ where } j^* = \min_j \left( \frac{|S_j|}{D_j} + \sigma_L^{(j)} \right), \quad \text{[Equation 14]}$$

where $\hat{f}_u^*$ is a final distortion-corrected image, $\hat{f}_u^{(j^*)}$ represents a $j^{*th}$ final distortion-corrected image, $D_j$ represents the total length of all straight lines in a $j^{th}$ repeatedly-corrected image, $S_j$ represents the set of straight lines extracted from the $j^{th}$ repeatedly-corrected image, $\sigma_L^{(j)}$ represents the standard deviation of feature points of the $j^{th}$ repeatedly-corrected image, and $|\cdot|$ the number of elements of the set.

Since the final corrected-image is selected by using feature points and straight-line information in combination according to Equation 14, it is possible to prevent a straight line from being excessively corrected when the straight line is directed toward a distortion center in the image.

FIG. 9 shows a geometrically distorted image and images corrected by using two different correction methods according to an exemplary embodiment of the present invention. FIGS. 9A, 9B, and 9C show a received distorted image, an image corrected according to the pattern-based method, which is an existing correction method, and an image corrected according to the proposed correction method of the present invention, respectively.

Figure 10:
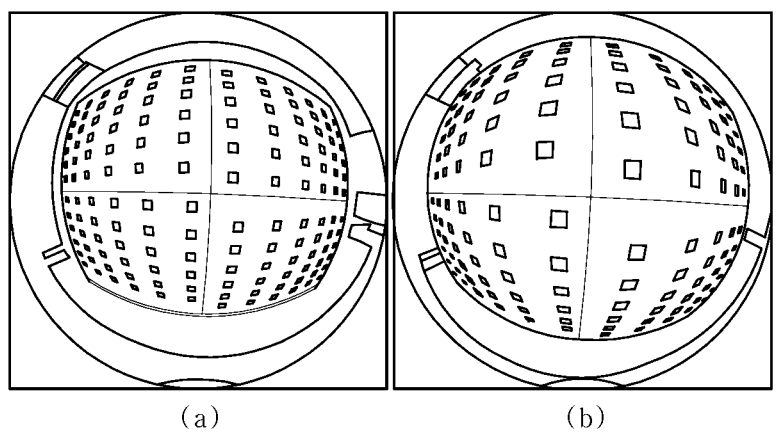
FIG. 10 shows a calibration pattern image and a distorted pattern image acquired at different distances with a 360-degree field-of-view (FOV) camera according to an exemplary embodiment of the present invention.

FIG. 10 shows a calibration pattern image and a distorted pattern image acquired at different distances with a 360-degree field-of-view (FOV) camera according to an exemplary embodiment of the present invention, and FIG. 11 is a set of diagrams showing distances in an ideal pattern image and distances in a corrected pattern image with slight distortion according to an exemplary embodiment of the present invention. FIG. 11A shows an ideal pattern image, and FIG. 11B shows a distortion-corrected pattern image.

Referring to FIG. 9A first, a received distorted image is acquired with a camera having a 360-degree FOV, and the distorted image is corrected by estimating a distortion parameter from the acquired image. Referring to FIG. 9B, according to the pattern-based method which is an existing correction method, calibration results are inaccurately calculated because the number of calibration pattern points is insufficient to estimate a distortion rate. On the other hand, as shown in FIG. 9C, image distortion may be accurately removed by the proposed correction method of the present invention. Meanwhile, in FIGS. 9B and 9C, regions including vertically arranged points are enlarged for comparison.

Referring to FIG. 10, correction points are present only around the image center, and there is no characteristic for calibration in the surrounding region. Therefore, performance of the calibration pattern-based correction method is limited.

For more objective evaluation, the correction method of the present invention proposes a distance ratio as a new measurement standard for evaluating the performance of correcting geometric distortion. More specifically, according to the proposed correction method of the present invention, distance ratios are defined in three directions including a horizontal direction, a vertical direction, and a diagonal direction as shown in Equation 15 below.

$$\psi_H = \frac{\sum \hat{r}_H}{\sum r_H}, \psi_V = \frac{\sum \hat{r}_V}{\sum r_V}, \text{ and } \psi_D = \frac{\sum \hat{r}_D}{\sum r_D} \qquad \text{[Equation 15]}$$

In Equation 15, $r_H$ and $\hat{r}_H$ are the distance between two points which are horizontally adjacent in an undistorted image and a corrected image, respectively. $\psi_H$, $\psi_V$, and $\psi_D$ are distance ratios in the horizontal direction, the vertical direction, and the diagonal direction, respectively.

The corresponding relationship between vertical and diagonal lines is defined as shown in FIG. 11. The proposed distance ratios may be defined on the basis of the fact that the distance between points of a distorted pattern is smaller than the distance between points of an ideal calibration pattern. When correction results are identical to an ideal pattern, a distance ratio is close to 1.

In this regard, in Table 1, performance is compared in terms of distance ratio between the calibration pattern-based method, which is an existing correction method, and the proposed method of the present invention.

TABLE 1

| | The calibration pattern-based method | The proposed method |
|---|---|---|
| $\psi H$ | 1.885 | 1.372 |
| $\psi V$ | 1.720 | 1.442 |
| $\psi D$ | 2.963 | 2.004 |

Table 1 shows estimated distance ratios of FIGS. 9B and 9C. Referring to Table 1, it is possible to see that all of the three ratios of the proposed method of the present invention are closer to 1 than those of the calibration pattern-based method which is an existing correction method.

According to the proposed method of the present invention, a distortion parameter is estimated by using feature points FLPs of a distorted image, and then distortion is corrected by using the estimated distortion parameter.

Figure 12:
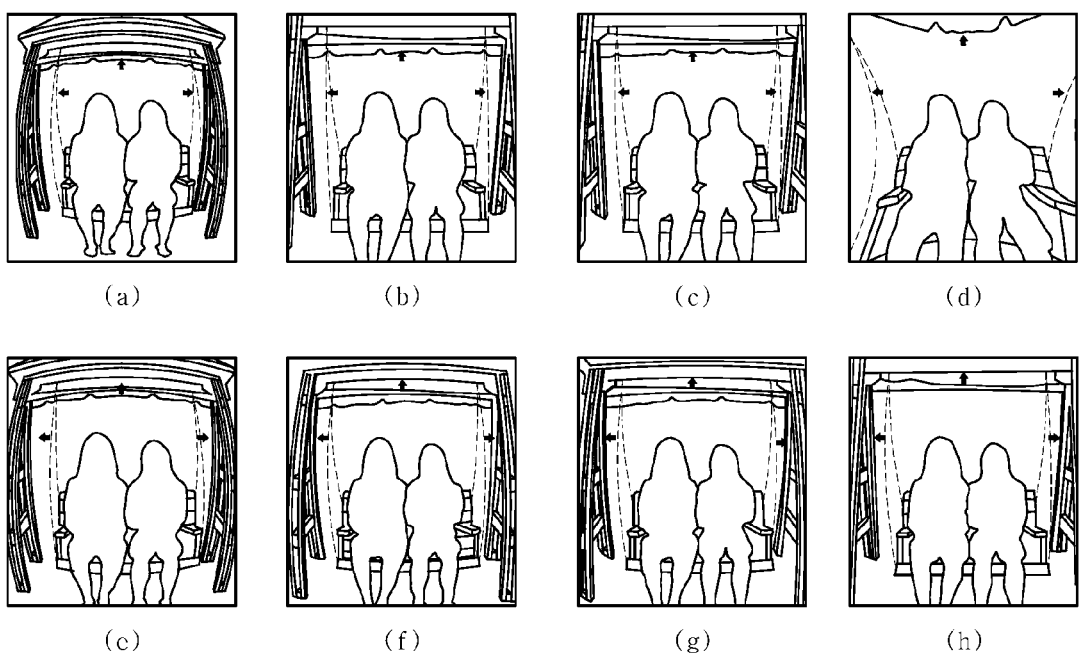
FIG. 12 is a set of images showing distortion correction results obtained by using an existing correction method (division model) and a proposed correction method of the present invention.

FIG. 12 is a set of images showing distortion correction results obtained by using an existing correction method (division model) and the proposed correction method of the present invention. FIG. 12A is a received distorted image, and FIGS. 12B to 12D are images showing results obtained by using an existing correction method (division model) with a distortion parameter k of 0.2, 0.26, and 0.3, respectively. FIGS. 12E to 12G are images showing results obtained by using the proposed correction method of the present invention in various iterative operations, and FIG. 12H is an optimally corrected image selected from among repeatedly corrected images output through various iterative operations according to the correction method of the present invention.

Referring to FIG. 12, it is possible to see that the proposed method of the present invention has superior performance to the existing correction method (division model) due to minimization of over-correction and an overall improvement in subjective image quality.

More specifically, the first row of FIG. 12 (FIGS. 12A to 12D) shows a received distorted image and three different correction result images obtained by using randomly selected distortion parameters k of 0.2, 0.26, and 0.3. The second row of FIG. 12 (FIGS. 12E to 12H) shows correction result images of the present invention including an optimally corrected image.

Referring to FIG. 12A, lines are bent outward in radial directions as indicated by arrows due to wide-angle lens distortion. However, after correction, lines are bent inward in radial directions as shown in FIG. 12D. In this regard, according to the existing method, it is not easy to select an optimally corrected result image from among FIGS. 12E to 12H.

On the other hand, according to the proposed method of the present invention, it is possible to automatically correct distortion by using an appropriately estimated distortion parameter. Also, an optimally corrected solution is selected by using feature points FLPs and straight-line analysis, and it is possible to overcome limitations, such as over-correction, imposed by correction.

Figure 13:
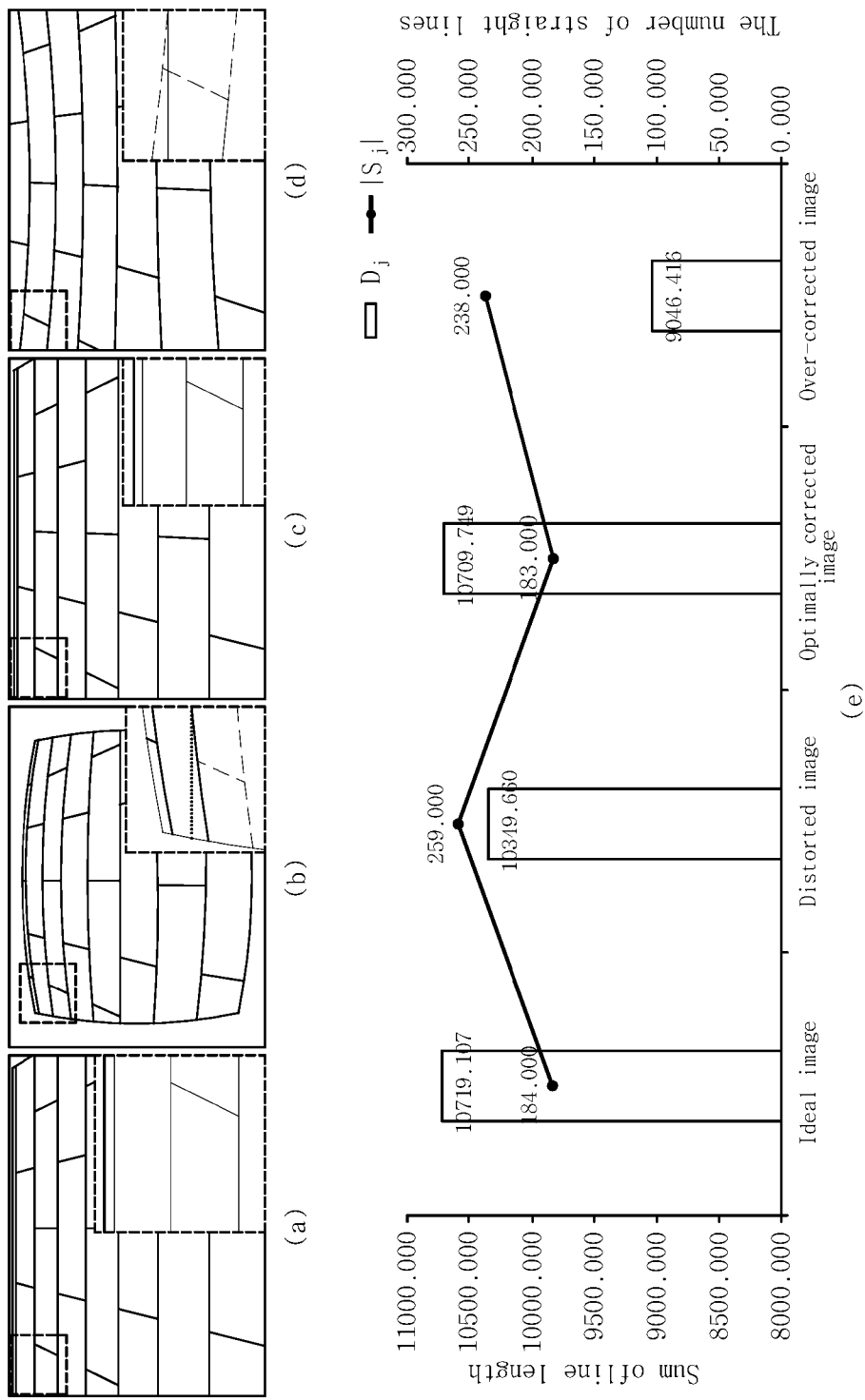
FIG. 13 shows the number of straight lines of simulated wide-angle lens images and corrected resultant images according to an exemplary embodiment of the present invention.

FIG. 13 shows the number of straight lines of simulated wide-angle lens images and corrected resultant images according to an exemplary embodiment of the present invention. FIG. 13A shows an ideal image, FIG. 13B shows a distorted image, FIG. 13C shows an appropriately corrected image, FIG. 13D shows an over-corrected image, and FIG. 13E shows the number of straight lines of FIGS. 13A to 13D.

FIG. 14 shows a final distortion-corrected image $\hat{f}^*_u$ and a number of straight lines $|S_j|$ based on Equation 14 according to an exemplary embodiment of the present invention. FIG. 14A shows a received distorted image, FIG. 14B shows a final corrected-image, FIG. 14C shows the number of iterations versus the number $|S_j|$ of straight lines, and FIG. 14D shows the number of iterations versus a result value $$\frac{|S_j|}{D_j} + \sigma_L^{(j)}$$

of the cost function calculated in a distortion-corrected image.

In the proposed method of the present invention, the characteristic of a wide-angle lens that a straight line is refracted into a curve is used to select an optimally corrected image.

First, as shown in FIG. 13A, a brick image is selected to count straight lines. When a straight line is bent, a resultant curve is divided into several short straight lines. For this reason, as an image is distorted more, a larger number of straight lines are generated. On the other hand, in an appropriately corrected image, a smaller number of straight lines are generated than in a distorted image and an over-corrected image as shown in FIG. 13E.

In comparing FIGS. 14C and 14D, the number of extracted straight lines $|S_j|$ and the result value $$\frac{|S_j|}{D_j} + \sigma_L^{(j)}$$

of the cost function calculated in the distortion-corrected image are minimized at the 18$^{th}$ iteration. In other words, straight-line information in a distorted image may be a major factor for selecting an optimally corrected image.

Since straight-line information is a major factor for selecting an optimally corrected image, it is also important to select an appropriate method for detecting straight lines. In this regard, the Flores method is a recent straight-line detection algorithm for correcting geometric distortion, but distortion effects which degrade the accuracy in detecting straight lines are not taken into consideration. This is described in detail below.

FIG. 15 is a set of views showing straight-line detection results and distortion correction results based on the Flores method and the correction method of the present invention. FIG. 15A shows a received distorted image, FIG. 15B shows an image in which straight lines are detected by using the Flores method, FIG. 15C shows an image in which straight lines are detected by using the correction method of the present invention, FIG. 15D is an image corrected by using the Flores method, and FIG. 15E is an image corrected by using the correction method of the present invention.

Referring to FIGS. 15B and 15C, the correction method of the present invention shows higher straight-line detection accuracy than the Flores method. Moreover, referring to FIG. 15E, it is possible to see that curves (bent lines) in the distorted image become straight lines through the correction method of the present invention. On the other hand, referring to FIG. 15D, curves do not become completely straight lines through the Flores method.

FIG. 16 is a set of views showing comparative experiment results according to an exemplary embodiment of the present invention. FIG. 16A shows received distorted images, FIG. 16B shows correction result images obtained by using Cho's correction method, and FIG. 16C shows correction result images obtained by using the proposed correction method of the present invention.

Referring to FIG. 16, it is possible to evaluate the accuracy in distortion correction by comparing the proposed correction method of the present invention with Cho's correction method. While Cho's correction method involves correcting lens distortion by using feature points FLPs, two characteristics, such as feature points FLPs and straight lines, are used in the proposed correction method of the present invention. This proposes a new numerical distortion measuring method to subjectively and objectively verify the two results. The foundation of numerical measuring is that a straight line in a 3D real world is a straight line in an undistorted image based on an optical projection theory.

As shown in FIG. 16, the proposed correction method of the present invention may completely remove distortion effects. On the other hand, in the results of Cho's method, distortion still remains at the junction between the ceiling and the wall as indicated by arrows.

Cho's method involves correcting distortion until a difference value between an estimated distortion parameter and a previously estimated distortion parameter becomes smaller than a pre-defined threshold value. Since the threshold value varies according to image size, the accuracy in distortion correction is low.

Figure 17:
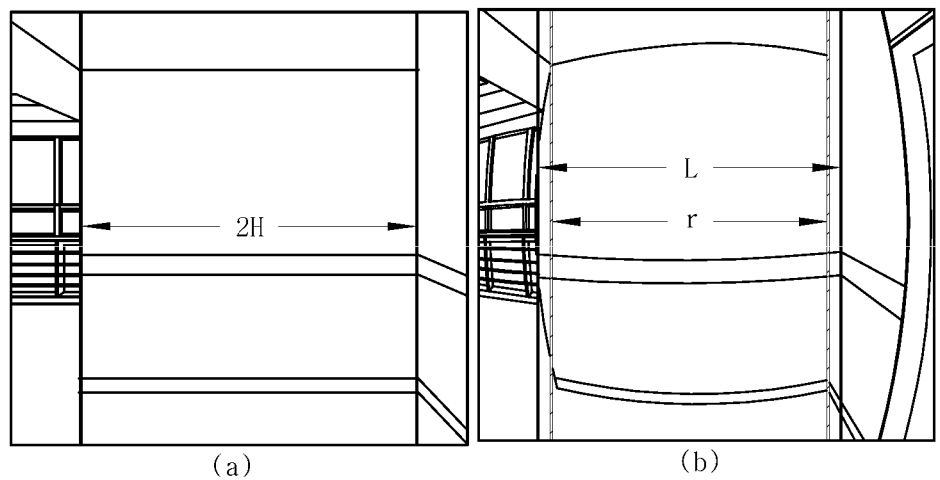
FIG. 17 shows a pair of an undistorted image and a distorted image as straight-line analysis images according to an exemplary embodiment of the present invention.

FIG. 17 shows a pair of an undistorted image and a distorted image as straight-line analysis images according to an exemplary embodiment of the present invention. FIG. 17A shows ideal (undistorted) straight lines, and FIG. 17B shows lines in a distorted image.

More specifically, referring to FIG. 17, straight lines in the undistorted image are transformed into curves in the distorted image. Each line is characterized by two lines, which have a relationship represented by a distortion ratio $R_D$. The distortion rate $R_D$ may be given by Equation 16 below.

$$R_D = \left(1 - \frac{L+\gamma}{2H}\right) \times 100, \quad \text{[Equation 16]}$$

where H is the distance between the right end and left walls in the ideal undistorted image, L is the maximum distance between the walls in the distorted image, and $\gamma$ is the minimum distance between the walls in the distorted image. In an undistorted image, 2H equals L+$\gamma$. Accordingly, the distortion rate becomes 0.

Table 2 compares the distortion ratio of correction results obtained by using Cho's method and the proposed off-line method of the present invention (FIG. 14) as shown in FIG. 16.

TABLE 2

|  | Cho's method (%) | The proposed method (%) |
|---|---|---|
| Left column | 7.485 | 6.492 |
| Right column | 5.873 | 1.157 |

Referring to Table 2, the distortion rate of the proposed method of the present invention is lower than that of Cho's method (see results on left column of FIG. 16 in Table 2). Since the tilt angle of a camera in the second test image differs from the tilt angle in the first test image, the second test image shows a lower distortion rate than the first image (see results on right column of FIG. 16 in Table 2).

The above-described system and method for correcting an image through estimation of a distortion parameter have the following effects:

First, it is possible to select an optimal distortion-corrected image using straight-line information of corrected images.

Second, it is possible to objectively correct distortion on the basis of feature information extracted from a distorted image and optical characteristics without using lens information, pattern information, or learned data.

Third, it is possible to optimally correct distortion through iterative estimation of a distortion parameter and an iterative distortion correction model.

Forth, it is possible to maintain constant performance by correcting distortion through a distortion parameter estimated on the basis of unique feature information of a measurement target.

Fifth, since the system and method can be applied to a system to which it is not possible to apply existing distortion correction methods, the system and method can be applied to various fields.

Sixth, it is possible to apply the system and method to extended application fields, such as a wide-area surveillance system and a high-end driver supporting system including a 360-degree augmented reality (AR) or virtual reality (VR) camera, as a wide image system.

Meanwhile, the term "image" used in this specification, claims, etc. is for the purpose of describing the concepts of terms and drawings.

Although the present invention has been described above with reference to embodiments for exemplifying the technical spirit of the present invention, those of ordinary skill in the art should appreciate that the present invention is not limited to the configurations and effects illustrated and described above and the present invention can be variously modified or altered without departing from the technical spirit of the present invention. Accordingly, all such changes and modifications should be construed as being within the scope of the present invention.

What is claimed is:

1. A system for correcting an image through estimation of a distortion parameter, the system comprising:
at least one processor configured to:
receive a distorted image including one or more measurement targets;
extract a plurality of feature points from each of the measurement targets;
compare distances between the plurality of extracted feature points and a center point of the received distorted image with each other and classify the one or more measurement targets as a distorted target and an undistorted target;
estimate a distortion parameter on a basis of standard deviations of a plurality of feature points of the classified distorted target and undistorted target;
correct the received distorted image on a basis of the estimated distortion parameter;
output one or more repeatedly-corrected images by repeatedly estimating the distortion parameter and repeatedly correcting the corrected image until the corrected image satisfies a preset condition; and
detect straight-line information including a number and length of straight lines in the one or more output repeatedly-corrected images and select a final corrected image on a basis of the straight-line information,
wherein the at least one processor selects the final corrected image according to a cost function given by an equation below such that a straight line directed toward a distortion center in the final corrected image is prevented from being excessively corrected:

$$\hat{f}_u^* = \hat{f}_u^{(j^*)}, \text{ where } j^* = \min_j \left( \frac{|S_j|}{D_j} + \sigma_L^{(j)} \right),$$

where $\hat{f}_u^*$ is a final distortion-corrected image, $\hat{f}_u^{(j^*)}$ represents a $j^{th}$ final distortion-corrected image, $D_j$ represents a total length of all straight lines in a $j^{th}$ repeatedly-corrected image, $S_j$ represents a set of straight lines extracted from the $j^{th}$ repeatedly-corrected image, $\sigma_L^{(j)}$ represents a standard deviation of feature points of the $j^{th}$ repeatedly-corrected image, and $|\cdot|$ a number of elements of the set.

2. The system of claim 1, wherein the at least one processor calculates the distortion parameter to be estimated according to a distortion parameter formula given by an equation below:

$$k^{(j)} = \frac{1}{N_F - 1} \sum_{i \neq i^*} \|\sigma_i^{(j)} - \sigma_{i^*}^{(j)}\|,$$

where $k^{(j)}$ represents a $j^{th}$ estimated distortion parameter, $N_F$ is a number of measurement targets, $\sigma_i^{(j)}$ represents a standard deviation of feature points of a distorted target, and $\sigma_{i^*}^{(j)}$ represents a standard deviation of feature points of an undistorted target.

3. The system of claim 1, wherein the at least one processor repeatedly corrects the corrected image according to iterative correction formulae given by equations below:

$$\hat{f}_u^{(j+1)} = \frac{1}{1 + k^{(j)} r^{(j)2}} \hat{f}_u^{(j)}, \text{ for } j = 0, 1, 2, \ldots, N_I,$$

where $\hat{f}_u^{(j+1)}$ represents a $j+1^{th}$ corrected image, $k_{(j)}$ represents a $j^{th}$ estimated distortion parameter, $r^{(j)}$ represents a distance between an arbitrary coordinate point of a $j^{th}$ corrected image and a center point of a received image, $\hat{f}_u^{(j)}$ represents the $j^{th}$ corrected image, and $N_I$ is the number of iterations, $$r^{(j)} = \sqrt{(x_d^{(j)} - x_c)^2 + (y_d^{(j)} - y_c)^2},$$

where $r^{(j)}$ represents a distance between an arbitrary coordinate point of a $j^{th}$ corrected image and a center point of a received image, $x_d^{(j)}$ and $y_d^{(j)}$ represent horizontal and vertical coordinates of the $j^{th}$ corrected image, and $x_c$ and $y_c$ represent coordinates of a center point of a distorted image.

4. The system of claim 1, wherein the one or more measurement targets are people, and
the plurality of feature points include a center point of an eye corresponding to an iris of a corresponding person's left eye, a center point of an eye corresponding to an iris of the corresponding person's right eye, an end point of the corresponding person's nose, a left end point of the corresponding person's mouth, and a right end point of the corresponding person's mouth.

5. The system of claim 4, wherein the the at least one processor classifies the one or more measurement targets as a distorted target and an undistorted target according to undistorted-target standard formulae given by equations below:

$$L_I = L_{i^*}, \text{ where } i^* = \underset{i \in \{1, \ldots, N_F\}}{\operatorname{argmin}} \|\mu_i - C\|,$$

where $L_I$ is an undistorted target, $L_{i^*}$ represents a measurement target at a shortest distance from a center point of a distorted image, $N_F$ represents a number of measurement targets, $\mu_i$ represents an average point of a plurality of feature points extracted from a measurement target, and $C=(x_c, y_c)$ is a center point of the received distorted image, $$L_i = \{p_{LE}^i, p_{RE}^i, p_N^i, p_{LM}^i, p_{RM}^i\}, \text{ and}$$

$$\mu_i = \frac{1}{5}(p_{LE}^i + p_{RE}^i + p_N^i + p_{LM}^i + p_{RM}^i),$$

where $L_i$ represent feature points of a measurement target, $\mu_i$ represents an average point of a plurality of feature points, $p_{LE}^i$ represents a center point of a left eye corresponding to an iris of the left eye, $p_{RE}^i$ represents a center point of a right eye corresponding to an iris of the right eye, $p_N^i$ represents an end point of a nose, $p_{LM}^i$ represents a left end point of a mouth, and $p_{RM}^i$ represents a right end point of the mouth.

6. A method of correcting an image through estimation of a distortion parameter, the method comprising:
   a distorted image receiving operation of receiving, by at least one processor, a distorted image including one or more measurement targets;
   a feature point extraction operation of extracting, by the at least one processor, a plurality of feature points from each of the measurement targets;
   a feature point classification operation of comparing, by the at least one processor, distances between the plurality of extracted feature points and a center point of the received distorted image with each other and classifying the one or more measurement targets as a distorted target and an undistorted target;
   a distortion parameter estimation operation of estimating, by the at least one processor, a distortion parameter on a basis of standard deviations of a plurality of feature points of the classified distorted target and undistorted target;
   an image correction operation of correcting, by the at least one processor, the received distorted image on a basis of the estimated distortion parameter;
   an iterative correction operation of repeatedly estimating, by the at least one processor, the distortion parameter and repeatedly correcting the corrected image until the corrected image satisfies a preset condition and outputting one or more repeatedly-corrected images; and
   a final corrected-image selection operation of detecting, by the at least one processor, straight-line information including a number and length of straight lines in the one or more output repeatedly-corrected images and selecting a final corrected image on a basis of the straight-line information,
   wherein the selecting the final corrected image is performed according to a cost function given by an equation below such that a straight line directed toward a distortion center in the final corrected image is prevented from being excessively corrected:

$$\hat{f}_u^* = \hat{f}_u^{(j^*)}, \text{ where } j^* = \min_j \left( \frac{|S_j|}{D_j} + \sigma_L^{(j)} \right),$$

where $\hat{f}_u^*$ is a final distortion-corrected image, $\hat{f}_u^{(j^*)}$ represents a $j^{*th}$ final distortion-corrected image, $D_j$ represents a total length of all straight lines in a $j^{th}$ repeatedly-corrected image, $S_j$ represents a set of straight lines extracted from the $j^{th}$ repeatedly-corrected image, $\sigma_L^{(j)}$ represents a standard deviation of feature points of the $j^{th}$ repeatedly-corrected image, and $|\cdot|$ a number of elements of the set.

7. The method of claim 6, wherein the distortion parameter estimation operation comprises calculating the distortion parameter to be estimated according to a distortion parameter formula given by an equation below:

$$k^{(j)} = \frac{1}{N_F - 1} \sum_{i \neq i^*} \left\| \sigma_i^{(j)} - \sigma_{i^*}^{(j)} \right\|,$$

where $k^{(j)}$ represents a $j^{th}$ estimated distortion parameter, $N_F$ is a number of measurement targets, $\sigma_i^{(j)}$ represents a standard deviation of feature points of a distorted target, and $\sigma_i^{*(j)}$ represents a standard deviation of feature points of an undistorted target.

8. The method of claim 6, wherein the iterative correction operation comprises repeatedly correcting the corrected image according to iterative correction formulae given by equations below:

$$\hat{f}_u^{(j+1)} = \frac{1}{1 + k^{(j)} r^{(j)2}} \hat{f}_u^{(j)}, \text{ for } j = 0, 1, 2, \ldots, N_I$$

where $\hat{f}_u^{(j+1)}$ represents a $j+1^{th}$ corrected image, $k^{(j)}$ represents a $j^{th}$ estimated distortion parameter, $r^{(j)}$ represents a distance between an arbitrary coordinate point of a $j^{th}$ corrected image and a center point of a received image, $\hat{f}_u^{(j)}$ represents the $j^{th}$ corrected image, and $N_I$ is the number of iterations, $$r^{(j)} = \sqrt{(x_d^{(j)} - x_c)^2 + (y_d^{(j)} - y_c)^2}$$

where $r^{(j)}$ represents a distance between an arbitrary coordinate point of a $j^{th}$ corrected image and a center point of a received image, $x_d^{(j)}$ and $y_d^{(j)}$ represent horizontal and vertical coordinates of the $j^{th}$ corrected image, and $x_c$ and $y_c$ represent coordinates of a center point of a distorted image.

9. The method of claim 6, wherein the one or more measurement targets are people, and
   the plurality of feature points include a center point of an eyes corresponding to an iris of a corresponding person's left eye, a center point of an eye corresponding to an iris of the corresponding person's right eye, an end point of the corresponding person's nose, a left end point of the corresponding person's mouth, and a right end point of the corresponding person's mouth.

10. The method of claim 9, wherein the feature point classification operation comprises classifying the one or more measurement targets as a distorted target and an undistorted target according to undistorted-target standard formulae given by equations below:

$$L_I = L_{i^*}, \text{ where } i^* = \underset{i \in \{1, \ldots, N_F\}}{\operatorname{argmin}} \|\mu_i - C\|,$$

where $L_I$ is an undistorted target, $L_i^*$ represents a measurement target at a shortest distance from a center point of a distorted image, $N_F$ represents a number of measurement targets, $\mu_i$ represents an average point of a plurality of feature points extracted from a measurement target, and $C=(x_c, y_c)$ is a center point of the received distorted image, $L_i = \{p_{LE}^i, p_{RE}^i, p_N^i, p_{LM}^i, p_{RM}^i\}$, and $\mu_i = \frac{1}{5}(p_{LE}^i + p_{RE}^i + p_N^i + p_{LM}^i + p_{RM}^i)$, where $L_i$ represent feature points of a measurement target, $\mu_i$ represents an average point of a plurality of feature points, $p_{LE}^i$ represents a center point of a left eye corresponding to an iris of the left eye, $p_{RE}^i$ represents a center point of a right eye corresponding to an iris of the right eye, $p_N^i$ represents an end point of a nose, $p_{LM}^i$ represents a left end point of a mouth, and $p_{RM}^i$ represents a right end point of the mouth.

\* \* \* \* \*